(12) United States Patent
Montgomery et al.

(10) Patent No.: US 6,459,532 B1
(45) Date of Patent: Oct. 1, 2002

(54) PARALLAX AUTOSTEREOSCOPIC 3D PICTURE AND AUTOSTEREOSCOPIC 3D DISPLAY

(75) Inventors: David James Montgomery, Oxford (GB); Graham John Woodgate, Oxon (GB); David Ezra, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/620,492

(22) Filed: Jul. 20, 2000

(30) Foreign Application Priority Data

Jul. 24, 1999 (GB) .............................. 9917318

(51) Int. Cl.$^7$ ..................... G02B 27/22; H04N 13/04
(52) U.S. Cl. ..................... 359/462; 359/464; 348/54; 348/56
(58) Field of Search .............. 348/56, 42, 51; 359/462, 463, 464, 465

(56) References Cited

U.S. PATENT DOCUMENTS 5,917,539 A * 6/1999 Sorensen et al. ............. 348/56

FOREIGN PATENT DOCUMENTS

| GB | 2 320 156 A | 10/1998 |
| GB | 2 315 902 A | 11/1998 |

* cited by examiner

Primary Examiner—Audrey Chang
(74) Attorney, Agent, or Firm—Renner, Otto, Boisselle & Sklar

(57) ABSTRACT

A parallax barrier comprises a plurality of parallel vertical apertures or apertures. In a direction transverse to the apertures, the apertures have an optical transmission function which comprises a plurality of sub-apertures so that the function varies in this direction. In general, the function is constant in a direction parallel to the apertures or apertures. Such a barrier may be used with a spatial light modulator such as a liquid crystal display to form an autostereoscopic 3D display.

28 Claims, 30 Drawing Sheets

PARALLAX AUTOSTEREOSCOPIC 3D PICTURE AND AUTOSTEREOSCOPIC 3D DISPLAY

BACKGROUND OF THE INVENTION

1. Field of the Invention

The present invention relates to a parallax barrier, for instance for use in autostereoscopic three dimensional (3D) imaging such as 3D pictures and 3D displays. The present invention also relates to such 3D pictures and 3D displays. Applications include consumer and professional photography and display, 3D television, police identification, medical imaging, scientific visualisation and point of sales counters.

2. Description of the Related Art

FIG. 1 of the accompanying drawings illustrates diagrammatically an autostereoscopic 3D display of the front parallax barrier type. The display comprises a spatial light modulator (SLM) 1 in the form of a liquid crystal device (LCD). The SLM 1 is shown in simplified form as comprising substrates 2 and 3 containing a liquid crystal layer 4. Alignment layers, electrodes and other such elements are not shown in FIG. 1. The liquid crystal layer forms picture elements (pixels) such as 5, each of which is independently controllable to vary the transmission of light from a backlight (not shown). A parallax barrier 6 is provided on the front surface of the substrate 3. The parallax barrier 6 comprises an opaque layer in which are formed transparent apertures such as 7. The apertures 7 are parallel and evenly spaced and extend vertically. The display shown in FIG. 1 is of the type which supplies two two dimensional (2D) views forming an autostereoscopic pair so that each of the apertures 7 is aligned with and cooperates with two columns of pixels 5. The horizontal pitch of the apertures 7 is slightly less than twice the horizontal pitch of the columns of pixels 5 so as to provide viewpoint correction.

FIG. 1 illustrates how a viewing window 8 is formed at the intended viewing distance from the display. The apertures 7 of the parallax barrier 6 restrict the visibility of the pixels at the viewing plane, which contains the viewing window 8 and is located at the intended viewing distance from the display. The viewing window 8 represents the region at the viewing plane throughout which the pixel 5 is visible through the associated aperture of the parallax barrier 6. Two columns of pixels 5 cooperate with each aperture 7 to produce two adjacent viewing windows at the viewing plane. One of the columns of pixels associated with each aperture displays a vertical slice of one of the 2D images whereas the other column displays a slice of the other 2D image. When an observer is disposed so that the left and right eyes are at the corresponding viewing windows, the observer perceives a 3D image without having to wear any viewing aids.

FIG. 2 of the accompanying drawings illustrates diagrammatically how a display 10 of the type shown in FIG. 1 generates viewing zones 11 and 12 for the left and right eyes, respectively, of an observer. An arrow 13 represents the viewing plane at the intended viewing distance from the display 10. Because of the viewpoint correction, the viewing windows formed by the columns of pixels 5 and the apertures 7 across the surface of the display 10 are formed at the plane 13 and represent the widest parts of the viewing zones 11 and 12. When the eyes of the observer are located at the viewing windows in the viewing plane 13, the observer has the greatest lateral freedom of movement while being able to observe a 3D image. However, the viewing zones 11 and 12 illustrate that the observer also has some longitudinal viewing freedom. In other words, provided the eyes of the observer are located in the viewing zones 11 and 12, a 3D image will be observed.

In an ideal display of the type shown in FIGS. 1 and 2, the intensity distribution of light across each viewing window would be a "top hat" function. In other words, for each viewing window, the light intensity would be constant across the viewing window and zero outside the viewing window in the viewing plane. However, degradation of the window intensity distribution occurs so that the lateral and longitudinal viewing freedom of the observer is reduced compared with that illustrated in FIG. 2. Also, in an ideal display, right eye image data would not be present in the left eye viewing zone and vice versa. However, in practice, crosstalk occurs so that each eye can see some of the light intended for the other eye.

The lateral width of the apertures 7 of the parallax barrier 6 is a compromise between a wide aperture width, which allows high light throughput, and a narrow aperture width, which allows a small geometric image of the source and reduces crosstalk.

The brightness of such a display can be increased by increasing the width of the apertures 7. Also, the parallax barrier structure is visible because the light emission from the display occurs in a relatively small area of the barrier, resulting in a stripy appearance. This appearance may be improved by increasing the aperture width.

Crosstalk causes visual stress to an observer of this type of display. The threshold for crosstalk to avoid this effect is relatively low and may be less than 0.5% depending on the viewing conditions. Crosstalk can be reduced by reducing the aperture width. Similarly, viewing freedom can be increased by reducing the aperture width.

Although some of the performance parameters of the display are not entirely dependent on the width of the apertures 7, such as image brightness which can be changed by changing the intensity of the backlight, the diffraction performance and the crosstalk performance represent a compromise because diffraction performance decreases with decreasing aperture width whereas geometric performance increases. Both diffraction and geometric performance affect blurring of the ideal "top hat" window function.

A known technique for attempting to improve display performance is disclosed in Kirby-Meacham, "Autostereoscopic displays past and future", SPIE, vol. 624, 1986. This technique involves providing dark columns in the SLM relative to the parallax barrier. However, this technique results in lower display brightness and lower resolution. Also, specially made LCD panels are required which increases cost.

Although the display shown in FIG. 1 is of the front parallax barrier type, rear parallax barrier displays are also used. In such displays, the parallax barrier 6 is disposed on the rear surface of the substrate 2. Rear parallax barrier displays tend to suffer from the effects of Fresnel diffraction because of the diffractive properties of the positioning of a narrow aperture behind a relatively narrow pixel aperture. EP 0 847 208 and GB 2 320 156 disclose a technique for controlling the diffraction effects in a rear parallax barrier display by pre-compensating the illumination of the SLM so as to obtain a more uniform viewing window. EP 0 822 441 and GB 2 315 902 disclose a technique for reducing diffraction from pixel apertures in rear illuminated autostereoscopic displays by varying the pixel aperture function. Also, grey scale modification of the edges of the parallax barrier apertures is disclosed.

Soft edge techniques are also known in other technical fields such as optical systems for astronomy, optical spectroscopy and microscopy. Examples of these techniques are disclosed in G. Toraldo di Francia, Nouvo Cim Suppl vol. 9 p456 (1952); G Boyer et al. Appl vol. 12 p893 (1973); BR Friedon Optica Acta vol. 16 p795 (1969); B Boivin et at. Optica Acta vol. 27 p587 (1980); B Dossier et al. Jour Rech NRS n11 (1950). These techniques relate to the reduction of the Airy disk (zero order) size so as to improve resolution in optical instruments by varying the transmission intensity across light apertures but increasing the brightness of the higher orders of diffraction. A summary of Apodization, where apertures are given a spatially varying transmission function to reduce the size of the Airy disk in coherent precision optical systems such as laser cavities, is disclosed in "Apodization—coherent optical systems" SPIE vol. MS119 (1996) ISBN 0819421502.

SUMMARY OF THE INVENTION

According to a first aspect of the invention, there is provided a parallax barrier comprising a plurality of parallel elongate apertures extending in a first direction, characterized in that each of the apertures has an optical transmission function which comprises a plurality of sub-apertures such that the optical transmission function varies in a second direction which is perpendicular to the first direction.

The apertures may be of substantially the same width in the second direction.

The optical transmission function may be substantially constant in the first direction.

At least some of the sub-apertures of each aperture may have different widths in the second direction.

At least some of the sub-apertures of each aperture may have different optical transmission functions in the second direction.

The optical transmission function may be a sinc-squared function in the second direction. As an alternative, the optical transmission function may be the square root of a sum of Gaussian functions in the second direction. As a further alternative, the optical transmission function may be a step function in the second direction. The sub-apertures of each aperture may be superimposed such that the optical transmission function is non-zero throughout the aperture. Each of the apertures may comprise (2m+1) sub-apertures, where m is a positive integer. The optical transmission function in the second direction of the central sub-aperture may have a maximum which is greater than the maxima of the optical transmission functions in the second direction of the other sub-apertures of each aperture, m may be equal to 1.

The barrier may comprise a plurality of layers. The layers of the or each adjacent pair may be substantially in contact with each other. One of the layers may have an optical transmission function which substantially defines the apertures and the or each other of the layers may have an optical transmission function which substantially defines the sub-apertures. The or each other layer may comprise a single other layer. The optical transmission function of the one layer in the second direction may be a substantially rectangular function and the optical transmission function of the other layer in the second direction may be a sinusoidal function superimposed on a constant function so as to have non-zero optical transmission throughout the second direction.

The optical transmission function may be recorded in a photographic medium. As an alternative, the optical transmission function may be encoded as an optic axis orientation function in a birefringent layer cooperating with a polariser. As a further alternative, the barrier may comprise a liquid crystal device having a patterned electrode for applying an electric field across a liquid crystal layer of the device so as to form the optical transmission function.

According to a second aspect of the invention, there is provided an autostereoscopic 3D picture comprising a barrier according to the first aspect of the invention cooperating with a recording medium in which is recorded a spatially multiplexed 3D image.

According to a third aspect of the invention, there is provided an autostereoscopic 3D display comprising a barrier according to the first aspect of the invention cooperating with a spatial light modulator for modulating light with a spatially multiplexed 3D image.

The spatial light modulator may comprise a liquid crystal display.

It is thus possible to provide a parallax barrier of improved performance when associated with other optical devices, for example as part of a 3D picture or display. For example, it is possible to provide a wider range of illuminated area from the surface of a display while maintaining or reducing crosstalk. In particular, improved uniformity of illumination and reduced crosstalk can be obtained compared with conventional parallax barriers with "top hat" optical transmission functions.

A sub-aperture may be defined as an optical transmission function in which there is a maximum or a point of inflexion. In general, each sub-aperture has a maximum in the optical transmission function of the aperture so that the number of sub-apertures is equal to the number of maxima plus the number of points of inflexion.

BRIEF DESCRIPTION OF THE DRAWINGS

The invention will be further described, by way of example, with reference to the accompanying drawings, in which.

Like reference numerals refer to like parts throughout the drawings.

DESCRIPTION OF THE PREFERRED EMBODIMENTS

EP 0 822 441 and GB 2 315 902 disclose the use of grey scale edges to enhance parallax barrier performance. Such parallax barriers have optical transmission functions transverse to the longitudinal axis of each aperture comprising a single sub-aperture for each aperture. The performance of barriers of this type will be described hereinafter. The present invention relates to parallax barriers having optical transmissions functions transverse to the longitudinal axis of the apertures such that each aperture has more than one sub-aperture. Such an arrangement provides improved performance and specific examples of suitable optical transmission functions are described thereinafter.

Figure 1:
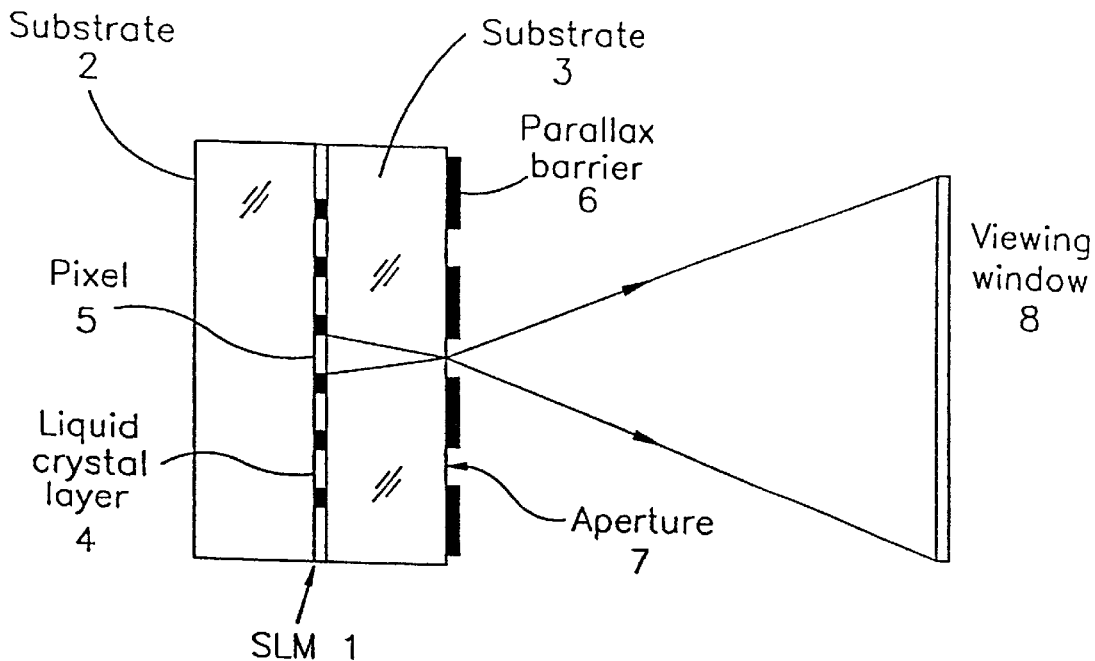
FIG. 1 is a diagram showing a horizontal cross sectional view of an autostereoscopic 3D display using a known type of parallax barrier.
Figure 2:
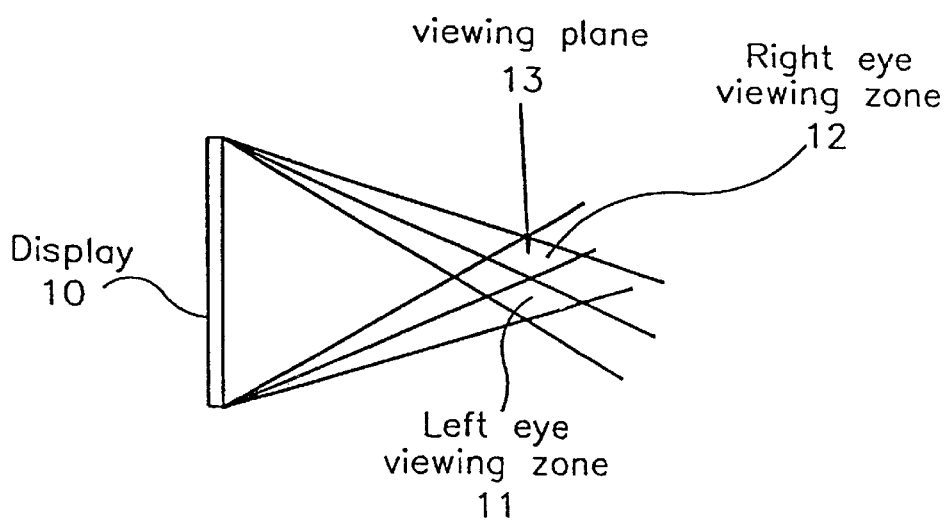
FIG. 2 is a diagrammatic plan view of the display of FIG. 1 illustrating the creation of viewing zones.
Figure 3:
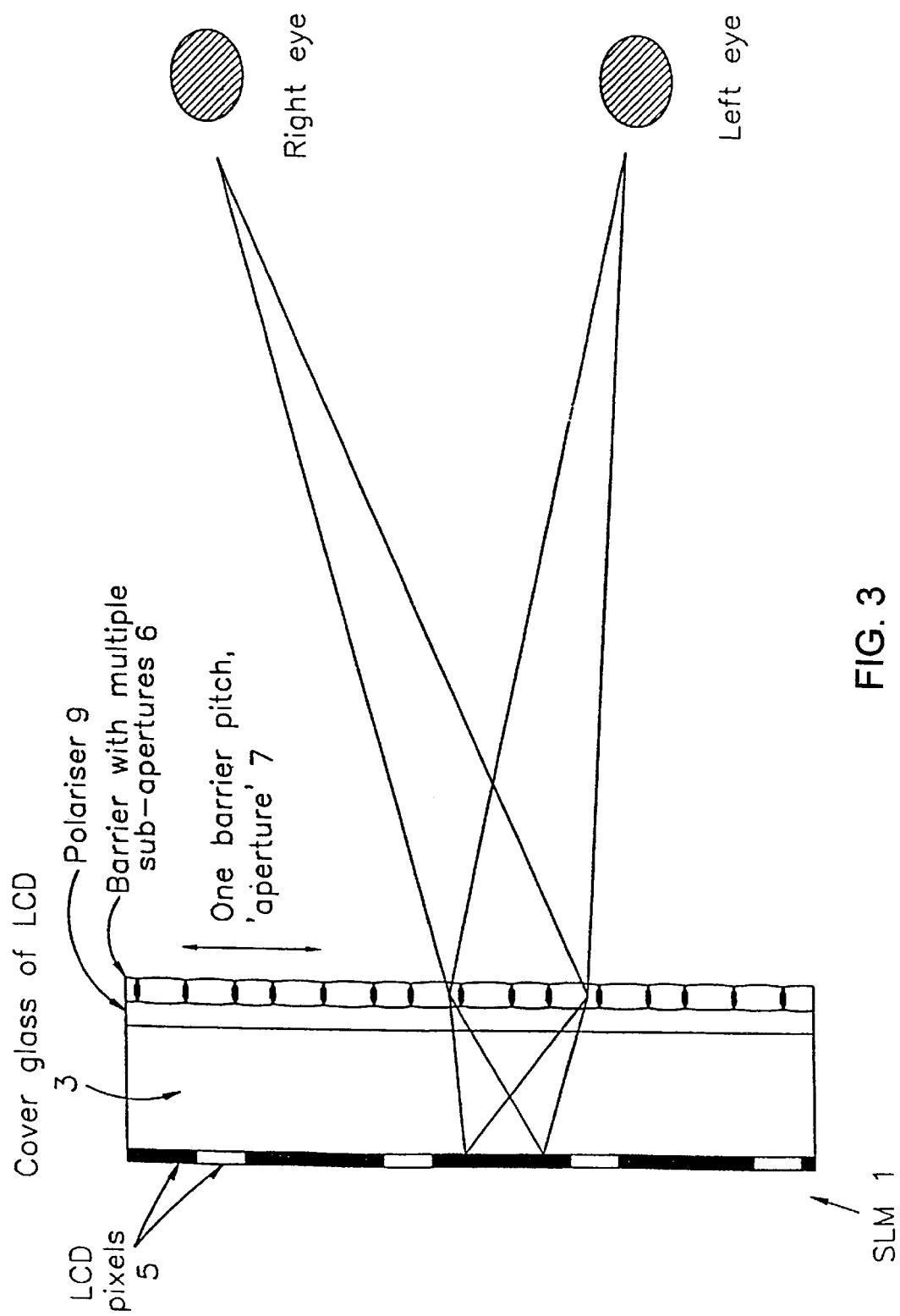
FIG. 3 is a horizontal cross-sectional view of a parallax barrier and part of an autostereoscopic 3D display constituting an embodiment of the invention.

The parallax barrier 6 shown in FIG. 3 differs from that shown in FIG. 1 in that each aperture 7 comprises a plurality of sub-apertures. Also, an output polariser 9 of the LCD SLM 1 is shown.

Figure 4:
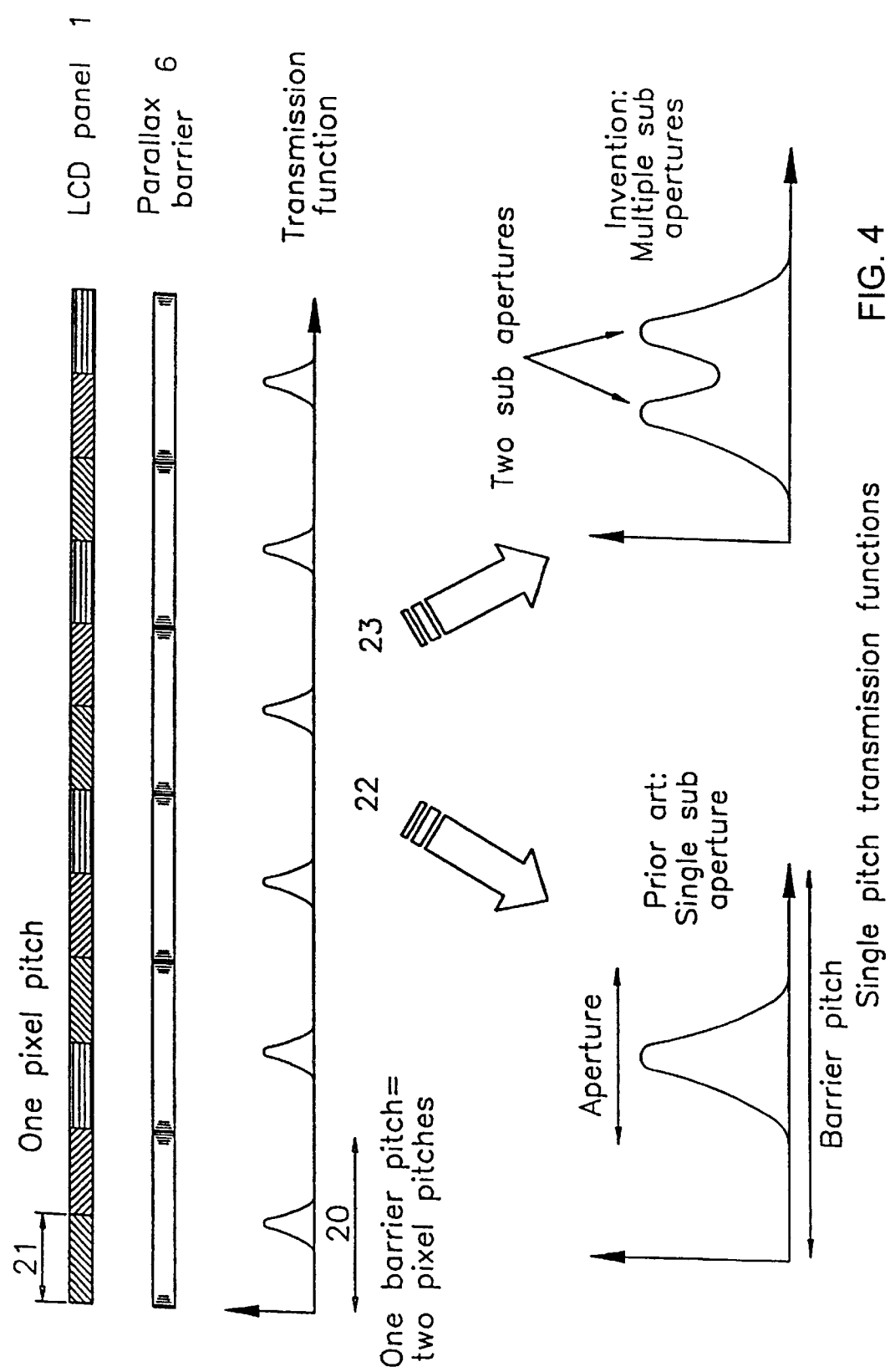
FIG. 4 is a diagram illustrating the definition of apertures and sub-apertures of a parallax barrier.

As illustrated in FIG. 4, the transmission function of the parallax barrier in the horizontal direction comprises a repeating series of smaller transmission functions. Each of these smaller transmission functions covers a distance known as the barrier pitch as illustrated at 20. The barrier pitch 20 is slightly less than twice the pixel pitch 21 so as to provide viewpoint correction. The transmission functions referred to herein are those of one barrier pitch.

In known parallax barriers such as that shown in FIG. 1, within each barrier pitch 20, the barrier is opaque with one transparent aperture; the transmission function of this is illustrated at 22.

In the present invention, each barrier pitch contains an aperture comprising several sub-apertures as illustrated at 23. This is characterised by the number of turning points in the transmission function. In particular, the number of sub-apertures is equal to the number of maxima plus the number of points of inflection in the transmission function.

In order to describe suitable optical transmission functions with multiple sub-apertures and the resulting parallax barriers, the mathematical foundations of diffraction thereby relating to parallax barriers will first be described. In this description, the following symbols are used with the following meanings:

N Number of Fresnel zones at the barrier.

f The mean front aperture width of the barrier.

σ The normalised mean front aperture width of the barrier=$\beta f/2$.

β The normalisation factor=$\sqrt{2n(\rho_0+nr_0)/\lambda\rho_0 r_0}$

α Size parameter in transmission equations, a variable that can be best matched to an application relative to the mean aperture width parameter, σ.

k Wavenumber of light=$2\pi/\lambda$.

Q Optical path.

λ Wavelength of light in a vacuum.

$\rho_0$ The distance between the barrier and the LCD pixels.

$r_0$ The viewing distance.

w The pitch of the barrier, i.e. the interval between successive repeats of the transmission function.

n The refractive index of the substrate glass.

z The lateral position of the aperture relative to the observer's lateral position=$-y\mu_n/(\mu_n+nr_0)$.

y The lateral position of the observer perpendicular to the observer-screen-source line.

pitch The pitch of the LCD pixels.

width The width of each LCD pixel.

φ The amplitude of the light at the observer position.

I The intensity of light at the observer from a point source $\alpha\phi^2$.

E The barrier transmission function.

W The normalised pitch of the barrier=$\beta w$.

Z The normalised lateral position of the aperture=$\beta z$.

FI The final intensity at the observer, having corrected for the finite size of the LCD pixels.

P The intensity pattern of the LCD pixel.

There are a number of assumptions in this model that need to be stressed:

In the model, there is one pixel for each aperture, as viewed by one eye. This relates to the production of a first window. The model can be simply extended to a second pixel to produce a second window by adding together the intensity functions of the two windows.

The barrier, glass substrate and polariser are index matched, free from scratches, dust and air pockets and are optically smooth and parallel.

The barrier photographic emulsion also has index matched optical properties.

Coherence. This is considered in more detail hereinafter.

The fundamentals of Fresnel diffraction theory are outlined in numerous texts, for example, Hecht, $3^{rd}$ Ed. Addison Wesley, 1998, p476.

The first assumption implies that one pixel and one aperture can be taken independently.

The term "coherence length" is a property of all forms of light and is the length in space over which a lightwave is sufficiently sinusoidal so that its phase can be predicted reliably. Two rays of light are "coherent" if they have emerged from the same point on a source and have travelled along different paths but with the path difference being less than their coherence length. If all rays have the same polarization direction, only coherent rays can interfere and produce diffraction patterns. If not, such rays add by scaler intensity alone.

Figure 5:
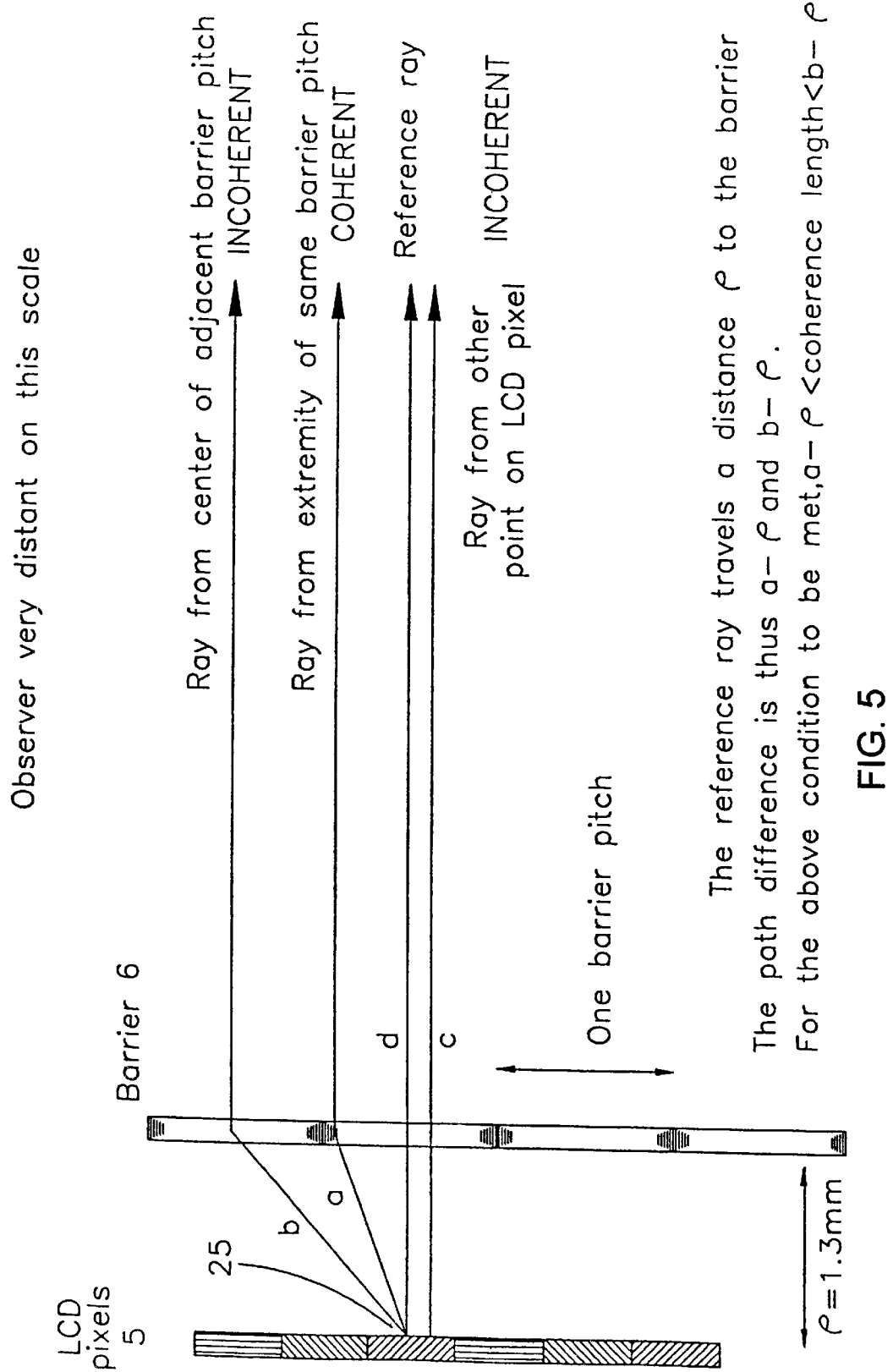
FIG. 5 is a diagram illustrating coherence properties in a display of the type shown in FIG. 3.

For the following analysis, it is important that a first ray of light b from a point 25 on the LCD passing through the centre of an aperture of the barrier 6 be coherent with another light ray a from the same point 25 on the LCD pixel passing through the extremity of the aperture. It is also important that another ray of light c passing through the extremity of an adjacent barrier aperture be incoherent with the rays a and b. Also, rays of light following identical paths and with identical lengths but from different points on an LCD pixel should be incoherent; such rays are illustrated at c and d in FIG. 5.

It can be shown that the Fresnel regime operates if the number of zones, N, is:

$$N = \frac{(f/2)^2}{\lambda \rho} L,$$

where f is the mean aperture width of the barrier, $\lambda$ is the wavelength of the light and $\rho$ is the distance between the barrier and the LCD screen.

The LCD pixel is a distributed source and here cannot be assumed to be a point source. Its treatment will consist of two parts. Firstly it will be treated as a point source, and then a convolution is taken to take the finite size into account.

Figure 6:
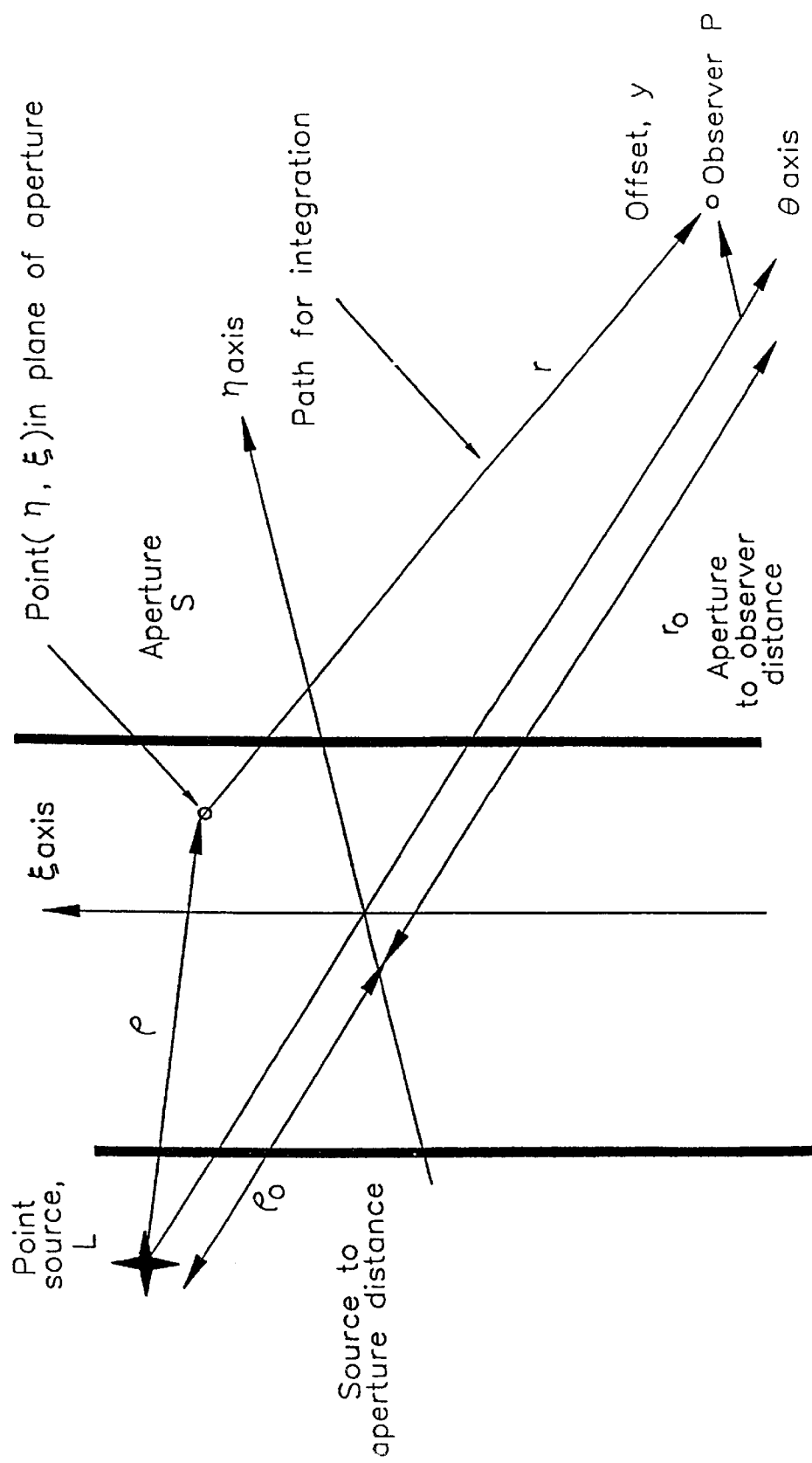
FIG. 6 is a diagram illustrating Fresnel geometry.

A full analysis is now presented regarding the mathematics of single aperture Fresnel diffraction. The geometry for the calculations is shown in FIG. 6, which shows an infinite aperture whose width is w. The coordinate system for this aperture is ($\eta$, §, 0), which are perpendicular to the aperture, along the aperture and perpendicular to the plane of the aperture, respectively. A point source L is disposed at a distance $\eta_o$ behind the aperture S. An observer sees the source at a distance $r_o$ from the aperture and a horizontal distance parallel with the $\eta$ axis of y. The diffraction pattern is made up of the sum of all rays from L through the aperture. Each ray passes through a point on the aperture's plane at ($\eta$, §) having travelled a distance $\rho$ from the source and r to the observer.

If the aperture has a transmission function E(x) which is only a function of $\eta$, then the amplitude contribution $\phi$ of one ray from L passing through ($\eta$§) is (from Hecht):

$$d\phi \propto \frac{K}{r\rho} e^{ikQ} dS$$

where dS is the area $d\eta d§$ of the small part of the aperture through width the ray passes, K is the inclination factor for this point, k is the wavenumber of the light used and Q is the optical path of the light from the source L to the observer passing through the aperture S. The wavenumber is equal to $2\pi/\lambda$ where $\lambda$ is the wavelength of the radiation.

The inclination factor and the denominator typically change by less than 0.3% and thus can be neglected. Also it can safely be assumed that $y<<r_o$ and $z<<r_o, \rho$.

The optical path Q is in this case $n\rho+r$ because the light passes through glass to the barrier and then through air (refractive index=1) to the observer.

Thus the distances are, from geometry:

$$\rho = \sqrt{(\alpha^2 + \eta^2 + §^2)}$$

$$r = \sqrt{(r_o^2 + (y-\eta)^2 + §^2)}$$

The total amplitude at P is found by integrating the above intensity equation:

$$\phi \propto \int_{\xi=-w}^{w} \int_{\eta=-w/2}^{w/2} E(\eta) \exp(ik(n\rho + r)) d\eta d\xi.$$

The distances can be simplified by using binomial expansions of the square roots:

$$Q = n\rho + r = n\sqrt{(\rho_o^2 + \eta^2 + §^2)} + \sqrt{(r_o^2 + (y-\eta)^2 + §^2)}$$

$$Q = n\rho + r = n\sqrt{(\rho_o^2 + \eta^2 + \xi^2)} + \sqrt{(r_o^2 + (y-\eta)^2 + \xi^2)}$$

$$= n\rho_o + r_o + \xi^2 \left(\frac{n\rho_o + v_o}{2\rho_o r_o}\right) + \eta^2 \left(\frac{n\rho_o + v_o}{2\rho_o r_o}\right) - \frac{y\eta}{r_o} + \frac{y^2}{2r_o}$$

The last term merely adds a constant phase to the result (because it is independent of $\eta$) and will not therefore be considered further.

This is identical to Hecht's analysis other than the fifth term on the right. Normally it is neglected, but the term will not be neglected in this case. The terms in the denominator are neglected. Thus:

$$\phi \propto \int_{\xi=-w}^{w} \exp\left\{ik\xi^2\left(\frac{\rho_w + nr_w}{2r_o\rho_o}\right)\right\} d\xi$$

$$\int_{\eta=-w/2}^{w/2} E(\eta) \exp\left\{ik\eta^2\left(\frac{\rho_o + nr_o}{2r_o\rho_o}\right) - \frac{iky\eta}{r_o}\right\} d\eta.$$

the term in § tends to a constant value independent of the position y in the window. It can thus be neglected. Completing the square in the other term yields the following equation:

$$\phi \propto \int_{\eta=-w/2}^{w/2} E(\eta) \exp\left\{ik\left(\frac{\rho_o + nr_o}{2\rho_o r_o}\right)\left(\left(\eta - \frac{\rho_o y}{\rho_o + nr_o}\right)^2 - \left(\frac{\rho_o y}{\rho_o + nr_o}\right)^2\right)\right\} d\eta.$$

Å variable $\tau$ is now defined such that $\tau=\eta+s$, where:

$$z = -\frac{y\rho_o}{\rho_o + nr_o}.$$

Thus:

$$\phi \propto \int_{\tau=t-w/2}^{w/2} E(\tau - z) \exp\left\{ik\left(\frac{\rho_o + nr_o}{2\rho_o r_o}\right)\tau^2 - ik\left(\frac{z^2(\rho_o + nr_o)}{2\rho_o r_o}\right)\right\} d\tau.$$

Another new variable u can be defined such that:

$$u = \beta\tau$$

$$\beta = \sqrt{\left(\frac{2n(\rho_o + nr_o)}{\rho_o r_o \lambda}\right)}$$

And hence:

$$\phi \propto \int_{u=\beta z - \beta w/2}^{\beta z + \beta w/2} E(u - \beta z) \exp\left\{\frac{i\pi}{2}(u^2 - \beta^2 z^2)\right\} du.$$

in this simplified equation, the wavenumber has been split up into the wavelength and refractive index n and the transmission function has incorporated a value of $\beta$ into itself.

The intensity I of light at P is thus given by:

$$I \propto |\Phi|^2.$$

The eye window function for a lateral position y is thus given by:

$$I(z) = \left[\int_{z-w}^{z+w} \cos\left(\frac{\pi(x^2 - Z^2)}{2}\right) E(x-Z) dx\right]^2 +$$

$$\left[\int_{z-w}^{z+w} \sin\left(\frac{\pi(x^2 - Z^2)}{2}\right) E(x-z) dx\right]^2,$$

where:

$$Z = \beta z$$

$$W = \frac{\beta w}{2}$$

$$z = -\frac{\rho_o y}{\rho_o + nr_o}$$

To incorporate the finite pixel, width, the intensity is convoluted with the pixel profile, which is of wavelength pitch and of active area width width. For a single window profile independent of the neighbouring pixel, this pixel is assumed to be off. Thus, the pixel function P(x) is a square wave between zero and unity of wavelength 2 pitch and width of the unity part width. Thus the final intensity F1 is given by:

$$FI(z) = \int P(x) I(z-x) dx$$

Crosstalk is estimated by integrating a small area in the centre at maximum brightness in the final intensity and comparing it to a region approximately a typical eye separation away, for example 62 mm. The viewing freedom can also be estimated by the width of the bright part of the window, defined by the width of the 90% levels. The width of the dark area can be estimated by the 5% limit width. The latter gives the relative freedom of movement for the observer.

A number of new barrier profile will be presented and compared with the standard "square edge" pattern, and will be analysed using the above theory. For this analysis the parameter σ is defined as the normalized mean front aperture width:

$$\sigma = \frac{f}{2}\sqrt{\left(\frac{2n(\rho + nr)}{\lambda \rho r}\right)} = \frac{\beta f}{2}.$$

The normalisation is identical to that of the barrier pitch w. This value is not a mathematical mean but a comparison with square-edged apertures. Most LCD or screen panels have an optimum aperture width for an application and this value is exactly that. It is thus easier to express, and modify, barrier transmission profiles if expressed as multiple of this number.

Square edge barriers for a single sub-aperture.

Known parallax barriers for 3D displays were mostly of this form. It is simply the above described parallax barrier with a simple transmission function: unity for a distance f, within the barrier pitch of w. Such a function gives a relatively inefficient design for a parallax barrier, especially on the small scale.

The softened square edge for a single sub-aperture.

For such barriers, a function is taken which suitably reproduces the square edge aperture function but which can also easily model such a aperture with differing degrees of soft edges. A suitable function is as follows:

$$E(x) = \frac{1}{2}(1 - \tanh(\alpha(|x| - \sigma)))$$

where α is a parameter which determines how steep the edges are, and σ is the mean width. The value of x here is a normalized one. The larger the value of α, the steeper and less soft the edges but a value of 20 is sufficient for quite a steep edge, α and σ can be chosen to optimize a given display and geometry. This means that control can be achieved of the values of crosstalk, brightness and the window widths of a given display.

A Gusassian profile for a single sub-aperture.

The previous example tends towards a sloping profile that can also be approximated by a Guassian profile:

$$E(x) = \exp\left(-\alpha \frac{x^2}{\sigma^2}\right)$$

Here, α is a parameter which governs an offset of the width of the Gaussian to control the brightness.

Multiple sub-apertures: The sinc-squared function.

To make the eye window profile appear more square, a sinc-squared function may be used as this is the far field diffraction pattern of a square aperture. The function to be considered is as follows:

$$E(x) = \left(\frac{\sin(\alpha \pi x / \sigma)}{(\alpha \pi x / \sigma)}\right)^2.$$

Here, as above, the value of α controls the relative width of the sinc-squared function relative to the mean aperture width parameter.

Gaussian approximations to any given function.

It is possible to model the profiles of any given functions by a series of Gaussian functions. The transmission function would thus have the following form:

$$E(x) = \sum_m \alpha_m \exp\left\{\frac{(x - \gamma_m \sigma)^2}{\delta_m^2 \sigma^2}\right\}.$$

Here, as above, $\alpha_m$ is the amplitude of each Gaussian, $\gamma_m$ is the position of the centre of the Gaussian and $\delta_m$ is the width of the Gaussian, the latter two in normalized numbers as multiples of the width of the square aperture σ.

It should also be noted that these are amplitude transmission functions, whose squares give the respective intensity transmission function. Since recording done on photographic film concerns intensities, it may be more useful to consider an amplitude distribution as the square root of a sum of Gaussians:

$$E(x) = \sqrt{\sum_m \alpha_m \exp\left\{\frac{(x - \gamma_m \sigma)^2}{\delta_m^2 \sigma^2}\right\}}$$

Square edges with multiple grey levels.

In this case, any given function can be modelled with a series of square edges of differing widths and also heights. If N new grey levels (including zero and unit) are introduced onto the barrier, then the barrier would have the following general transmission function:

$$E(x) = \sum_{m=1}^{N} \frac{N-m+1}{N} \left\{ \frac{1 - \tanh(\alpha_m ||x - \gamma_m \sigma| - \delta_m \sigma|)}{2} \right\}.$$

Here, the various values are defined in the section on apertures. This can also be superimposed on an aperture system as described above.

As noted above, it may be more useful to consider each grey level's intensity transmission as an arithmetic series rather than the amplitude:

$$E(x) = \sum_{m=1}^{N} \sqrt{\frac{N-m+1}{N}} \left\{ \frac{1 - \tanh(\alpha_m ||x - \gamma_m \sigma| - \delta_m \sigma|)}{2} \right\}.$$

In order to compare the performance of these transmission functions, the performance of a typical LCD in combination with various parallax barriers to form 3D displays are considered. The parallax barriers have apertures embodying specific examples of the above optical transmissions functions. In particular the relative brightness, crosstalk performance and width of the eye window function for each display are derived. The brightness is expressed as a number, which is a relative comparison of intensity (the square of the area under the barrier transmission function) between the barrier and the square edge aperture of width $\sigma$.

Figure 8:
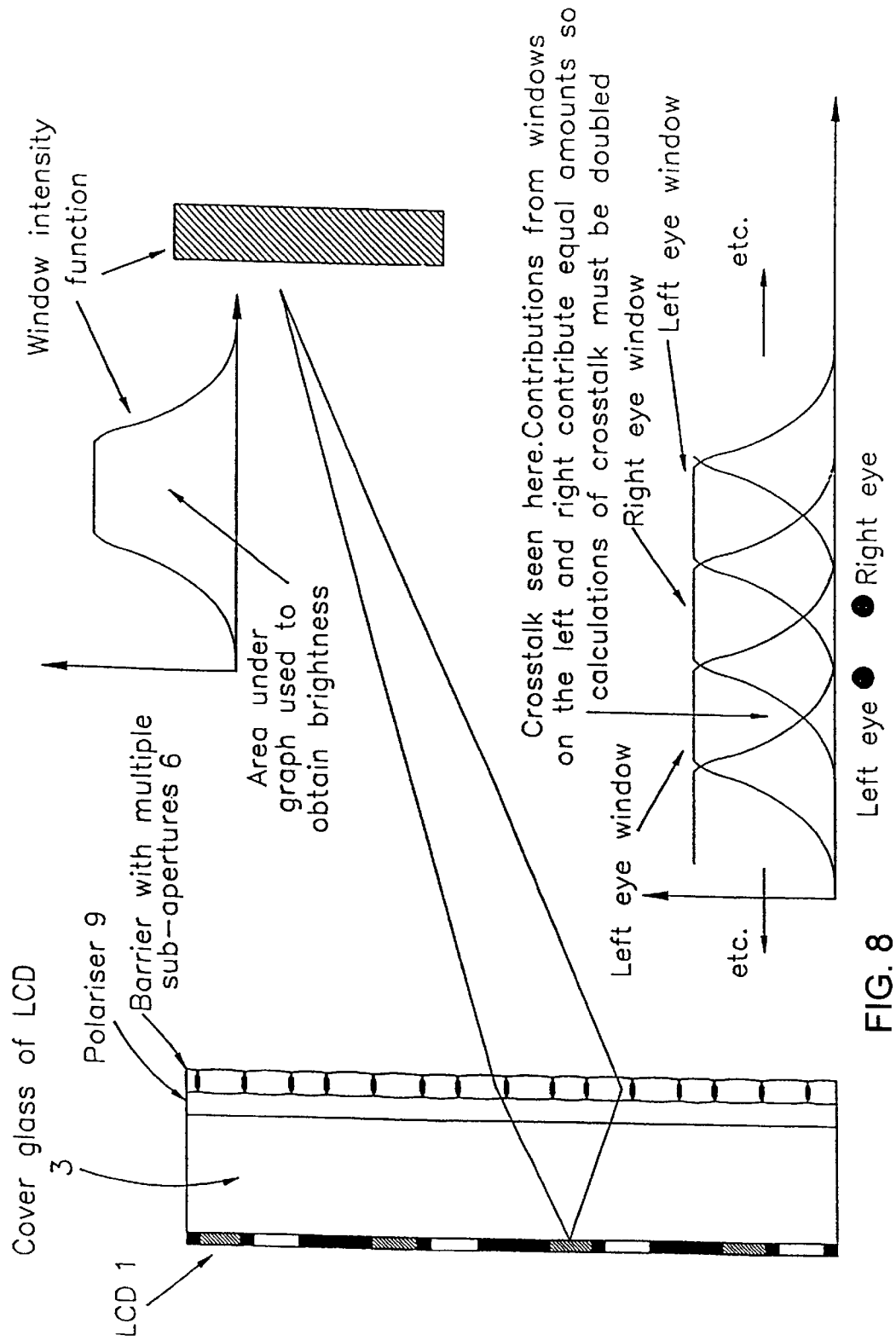
FIG. 8 is a diagram illustrating brightness and crosstalk calculation.

The crosstalk is presented as a percentage of the maximum brightness. In order to calculate the crosstalk, the above analysis is used to determine the window function, the area under which represents the brightness. The brightest and dimmest parts (separated by one typical eye separation) are identified and the ratio of these is found. This is then multiplied by two because the windows to the left and right contribute substantially equal amounts, as illustrated in FIG. 8. The result is then taken to be the crosstalk value.

The window width is expressed as two numbers, the distance between the 90% intensity points about the maximum and the distance between the 5% levels around the minimum. Finally, each barrier is compared with the performance of a square edged barrier with the same brightness.

An LCD panel with the width of each LCD pixel active area being width=85 μm and the pitch of the pixels being pitch=91 μm will be considered. The observer views the screen at a distance of r=870 mm. The refractive index of the glass of the LCD panel is n=1.55. The central wavelength of the light is λ=550 nm. The distance between the barrier and LCD is ρ=1.3 mm. The optimum square edge barrier transmission function has a pitch of w=180 μm and an aperture width of f=65 μm. This gives a value for W =βw=5.91 and u=2.13. The density of the block state of the barrier is set at ND 3, 5.

Figure 7:
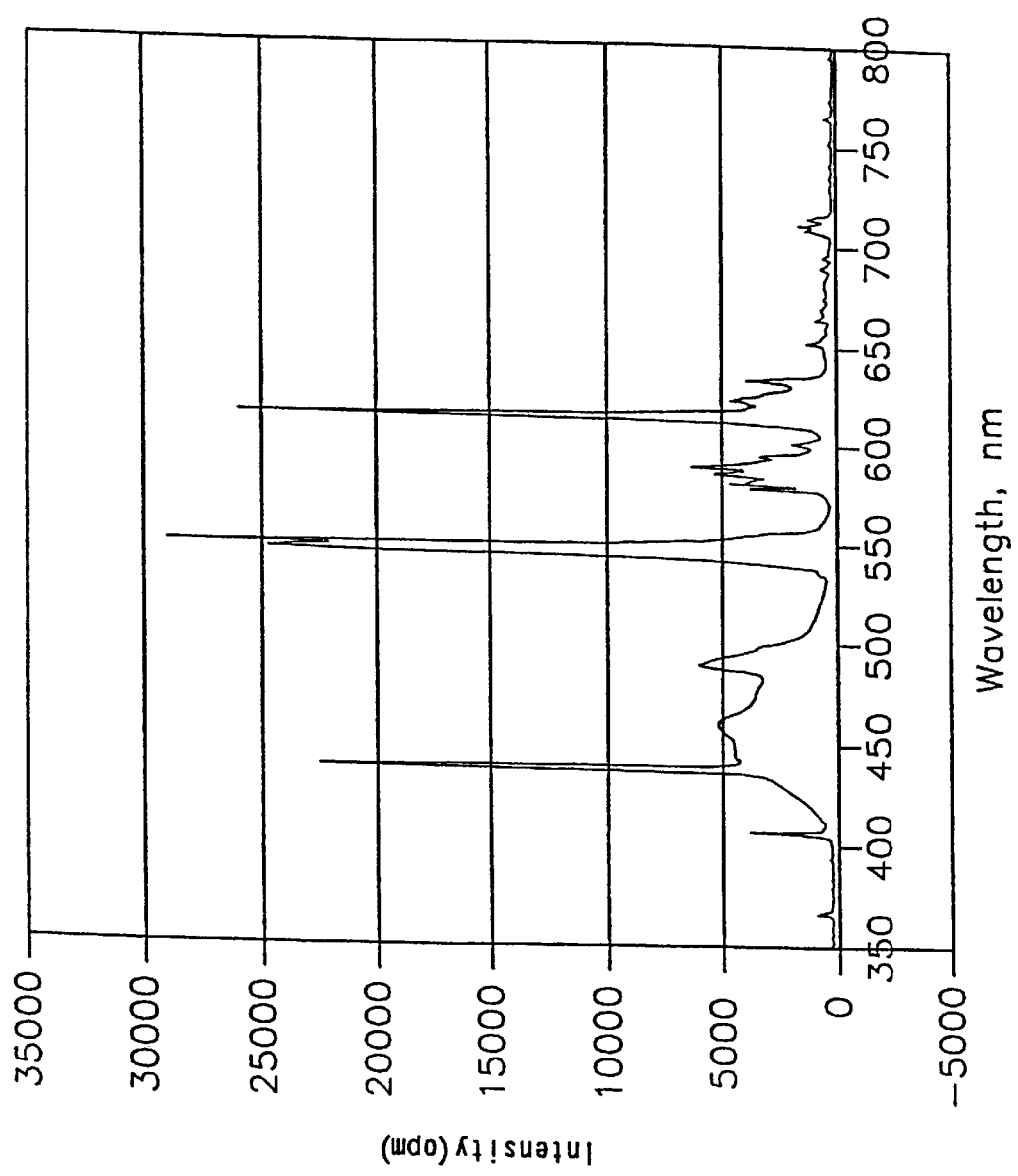
FIG. 7 illustrates a typical backlight spectrum.

FIG. 7 illustrates a typical backlight output spectrum. The widths of the individual peaks in the spectrum after passing through colour pixel filters is of the order of 50 nanometers corresponding to a coherence length of 6 micrometers. In the example given below, the path difference between light passing through the centre of a barrier pitch and light passing through the centre of the next barrier pitch is 16 micrometers so that such light rays are incoherent. The path difference between light passing through the centre of an aperture and light passing through the extremity of an aperture of the same barrier pitch is 4 micrometers so that such light is coherent. The assumptions made in the above analysis are therefore justified in this case.

Figure 9:
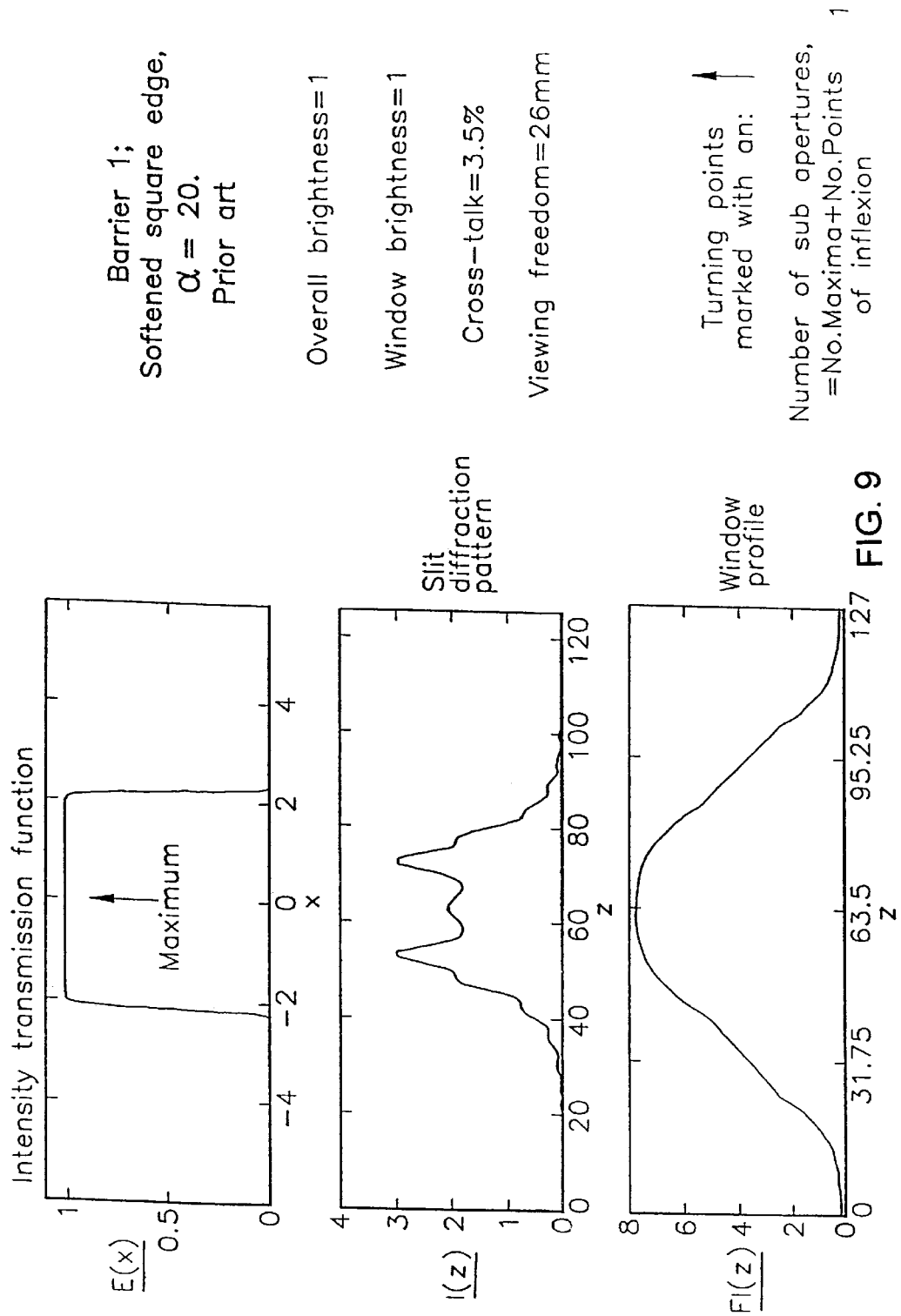
FIGS. 9 to 14 comprise graphs illustrating the optical transmission functions of apertures of known parallax barriers, the resulting light intensity profiles at viewing windows from a point source illumination, and the final intensity profiles at the viewing windows.
Figure 10:
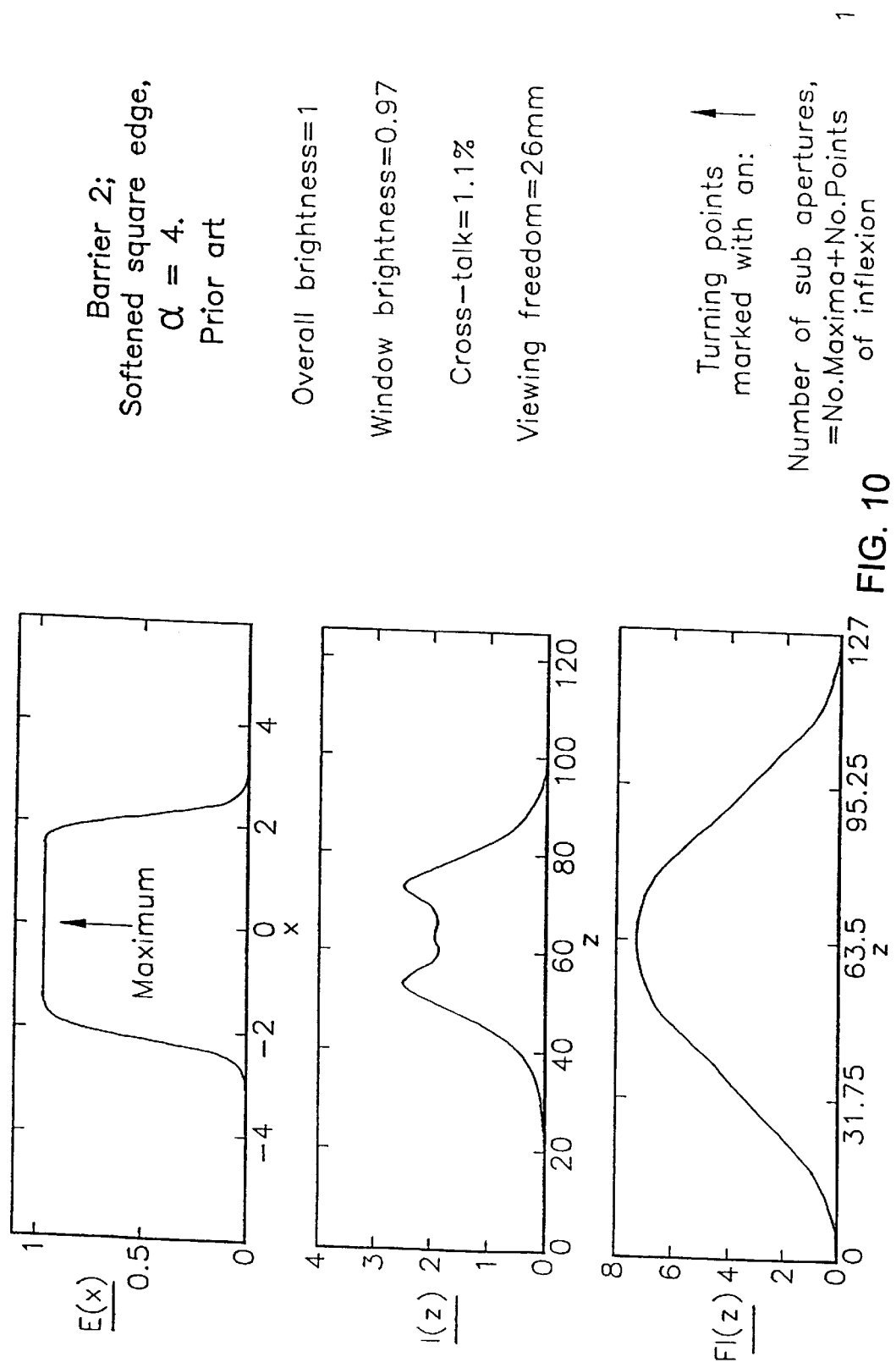
Figure 11:
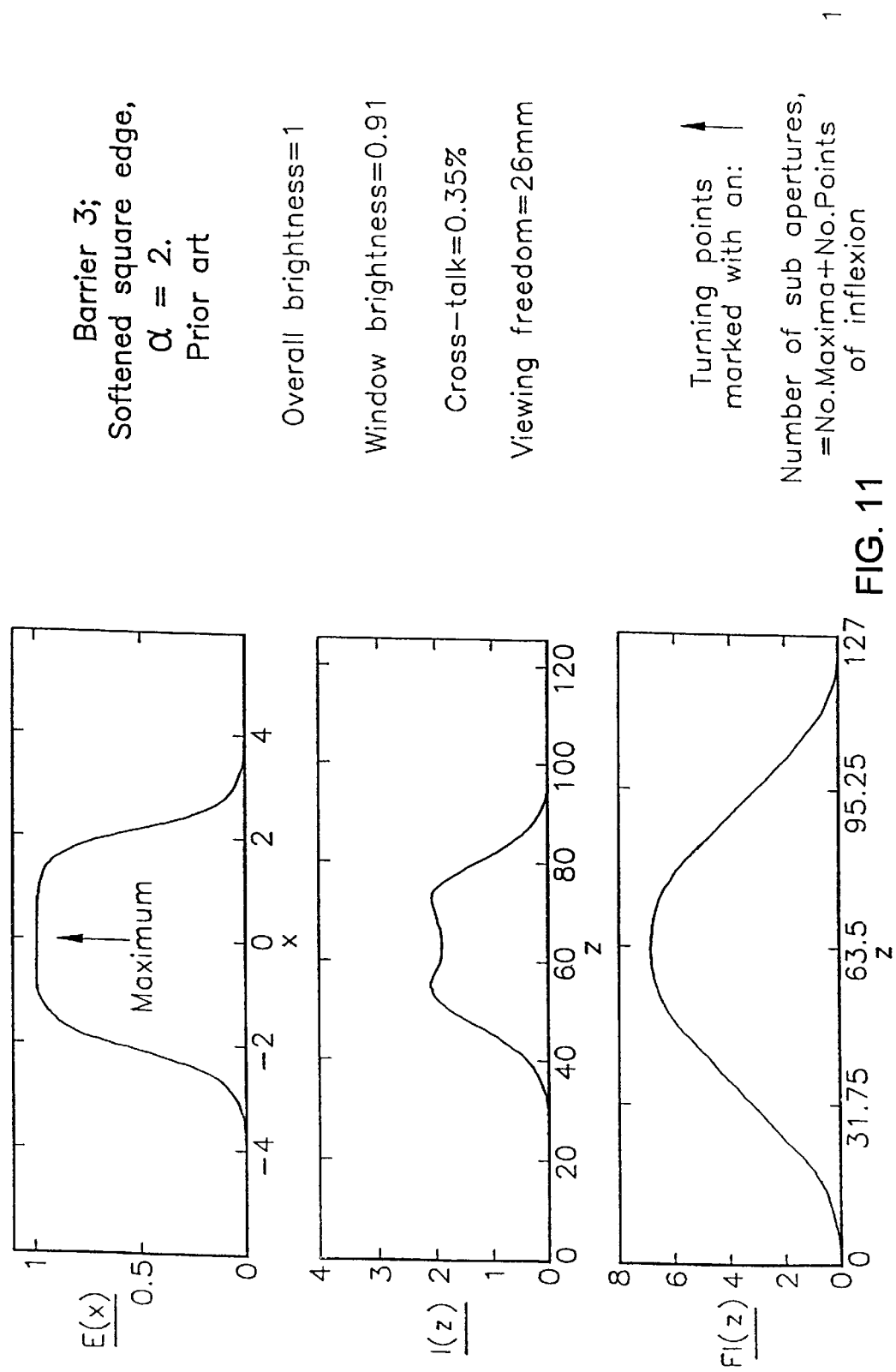
Figure 12:
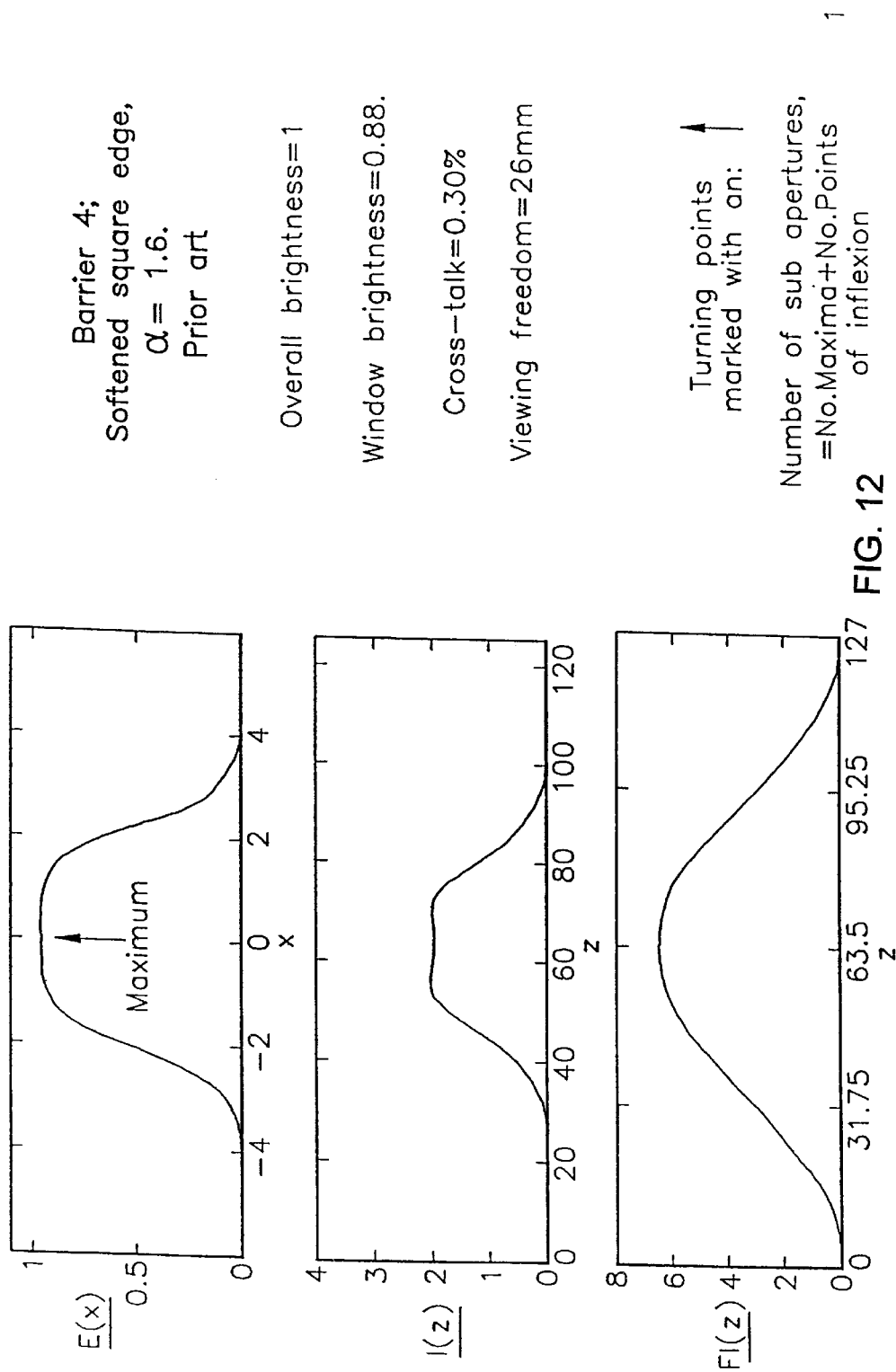
Figure 13:
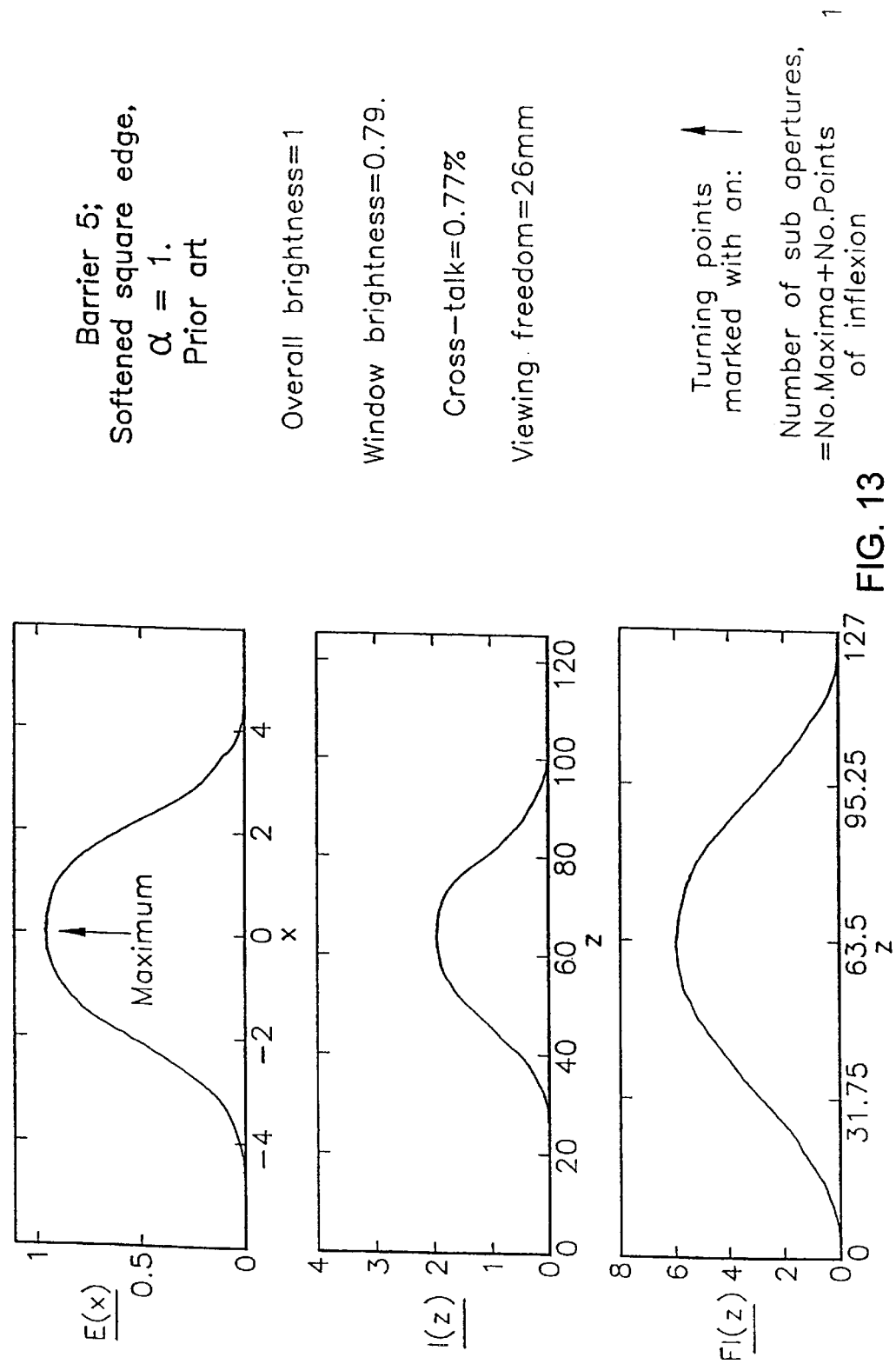
Figure 14:
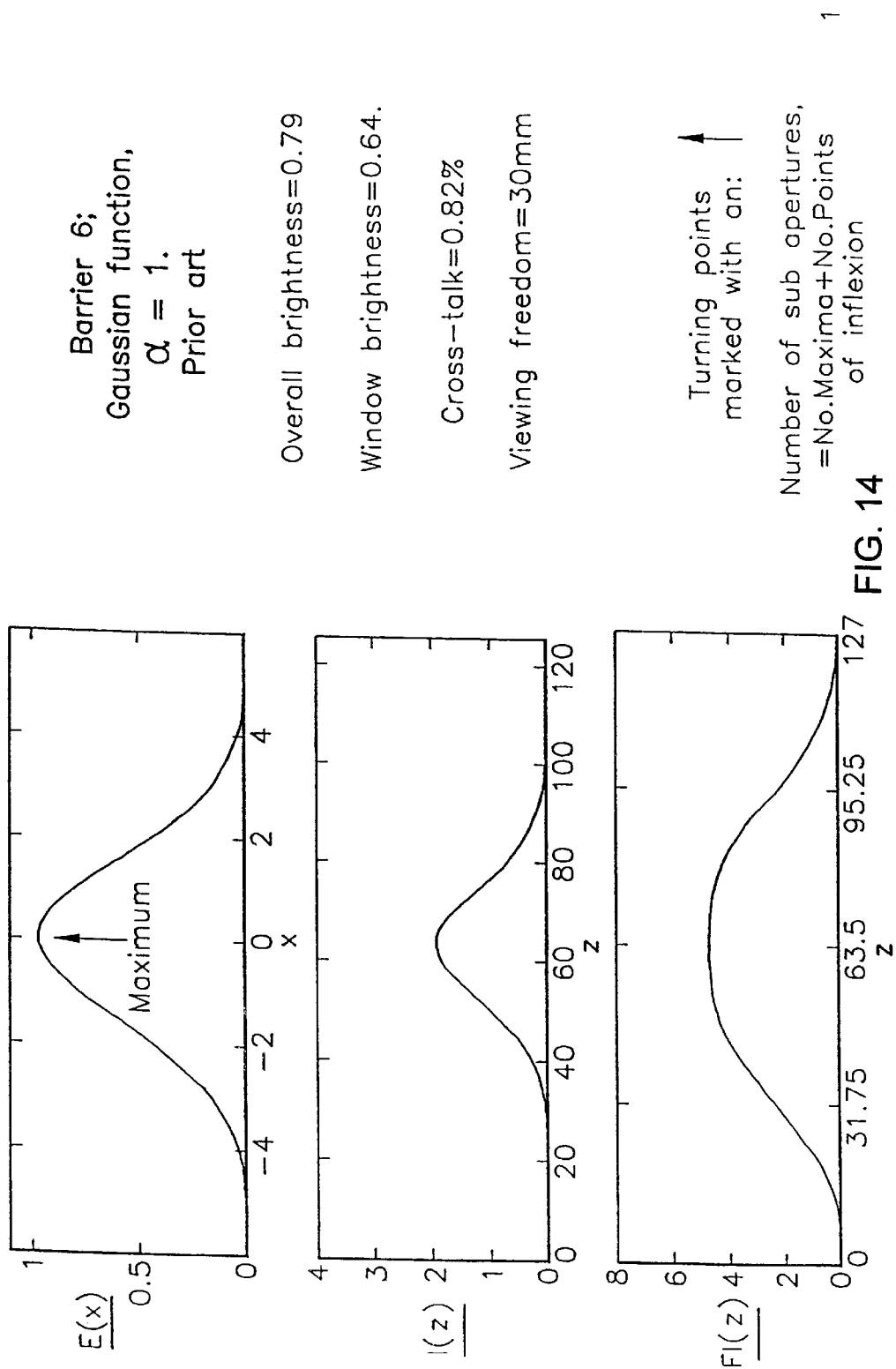
Figure 15:
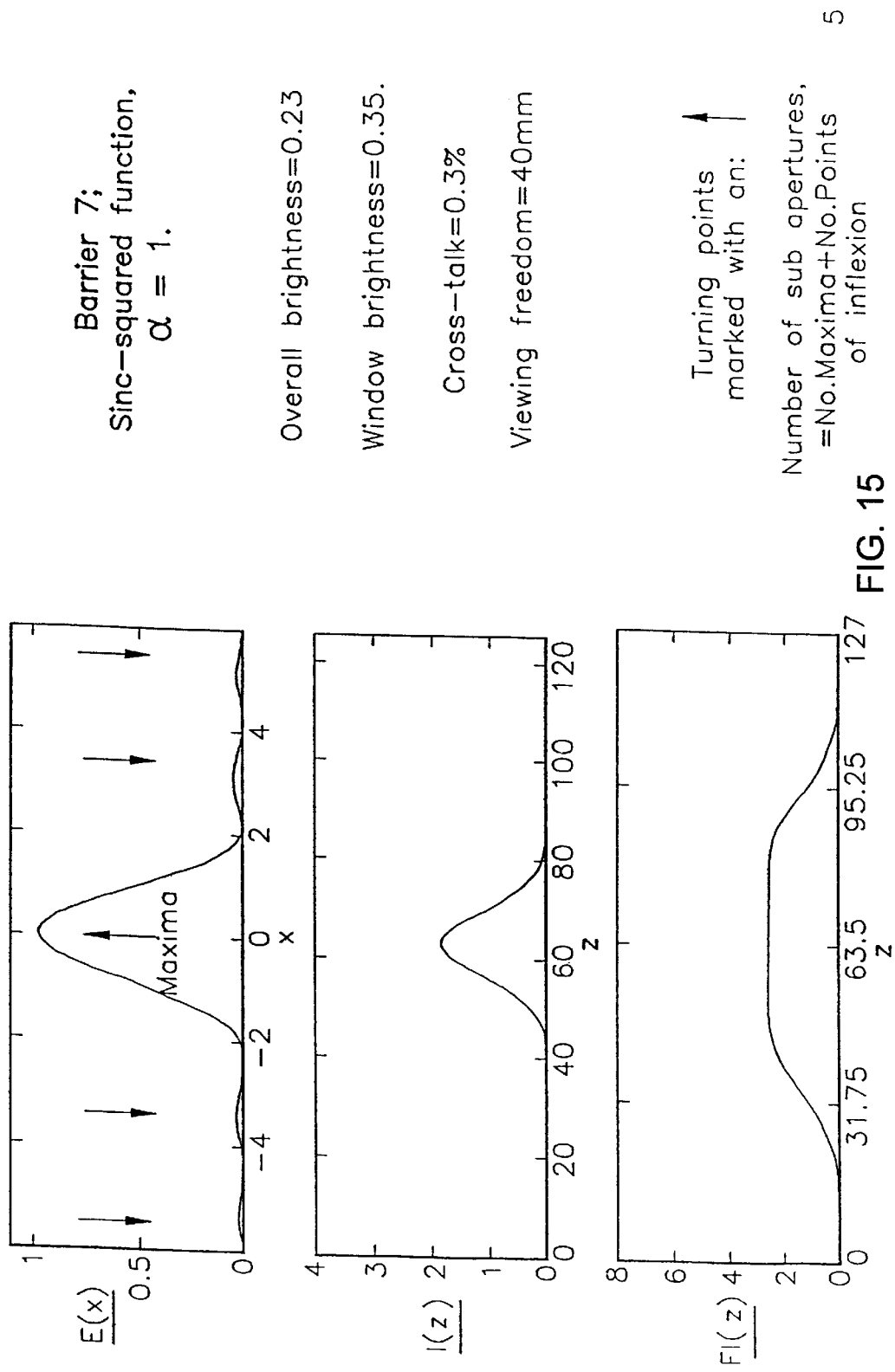
FIGS. 15 to 24 comprise graphs illustrating the optical transmission functions of apertures of parallax barriers constituting embodiments of the invention, the resulting light intensity profiles at the viewing windows from a point source illumination, and the final intensity profiles at the viewing windows.
Figure 16:
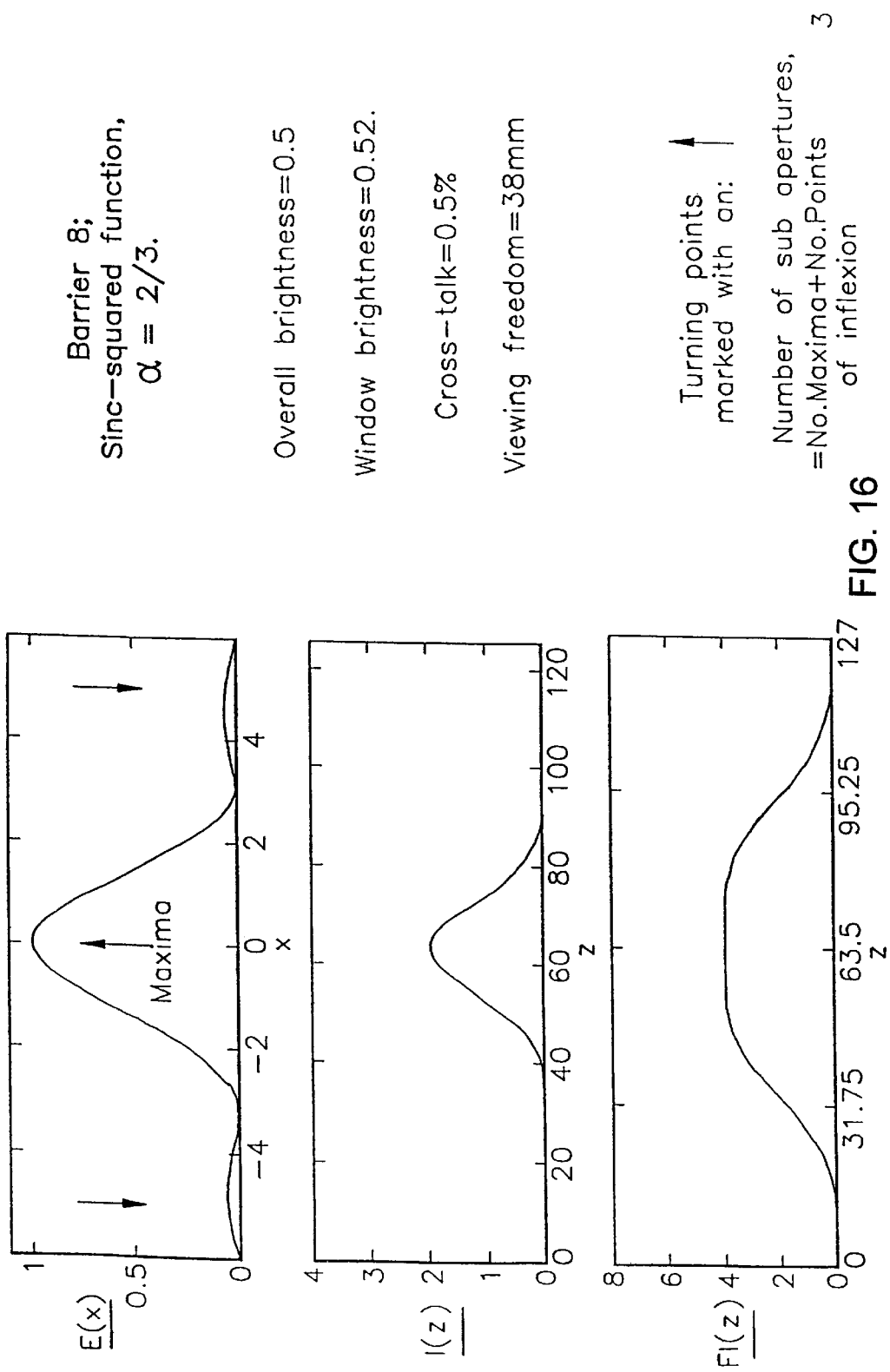
Figure 17:
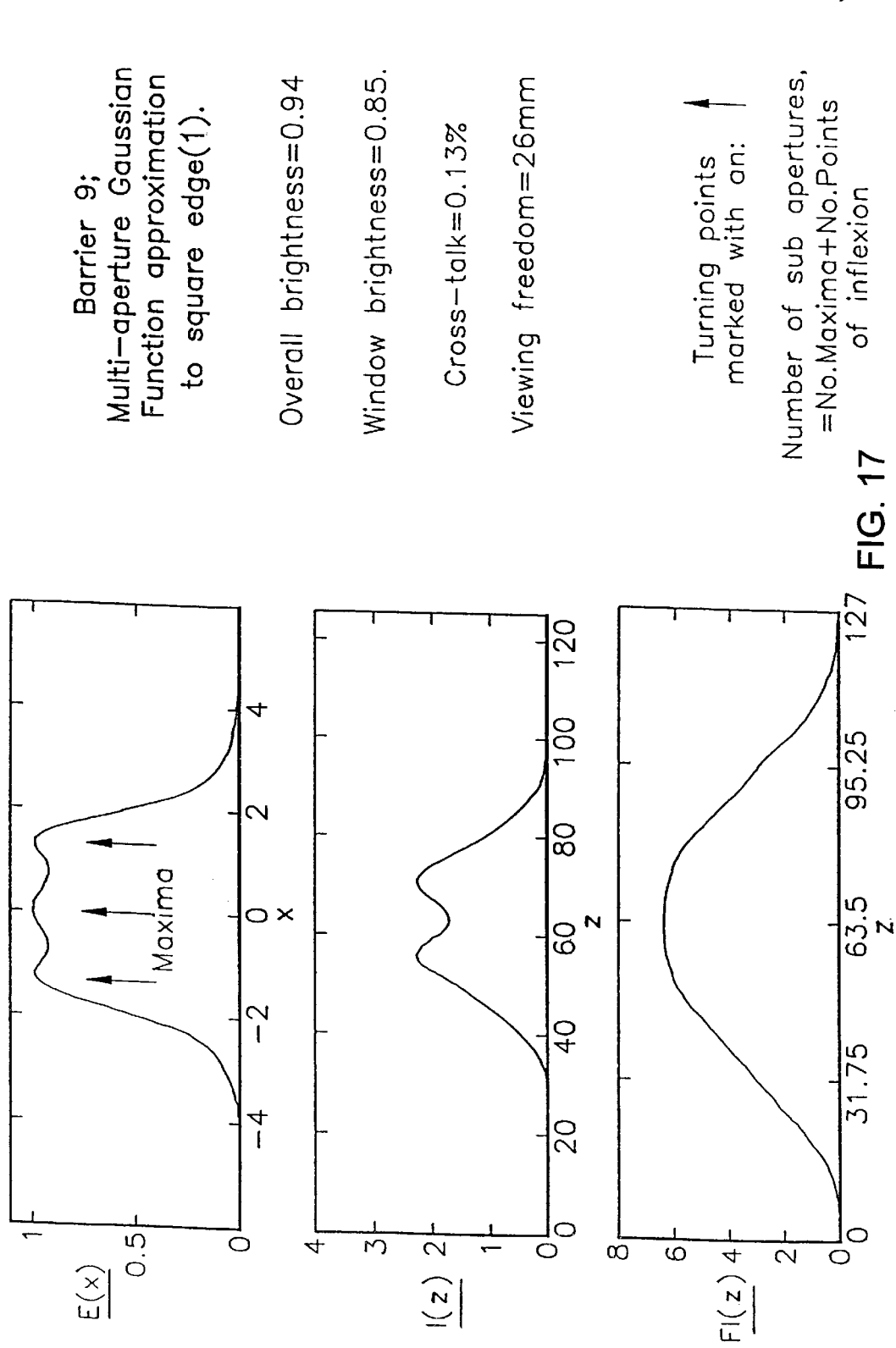
Figure 18:
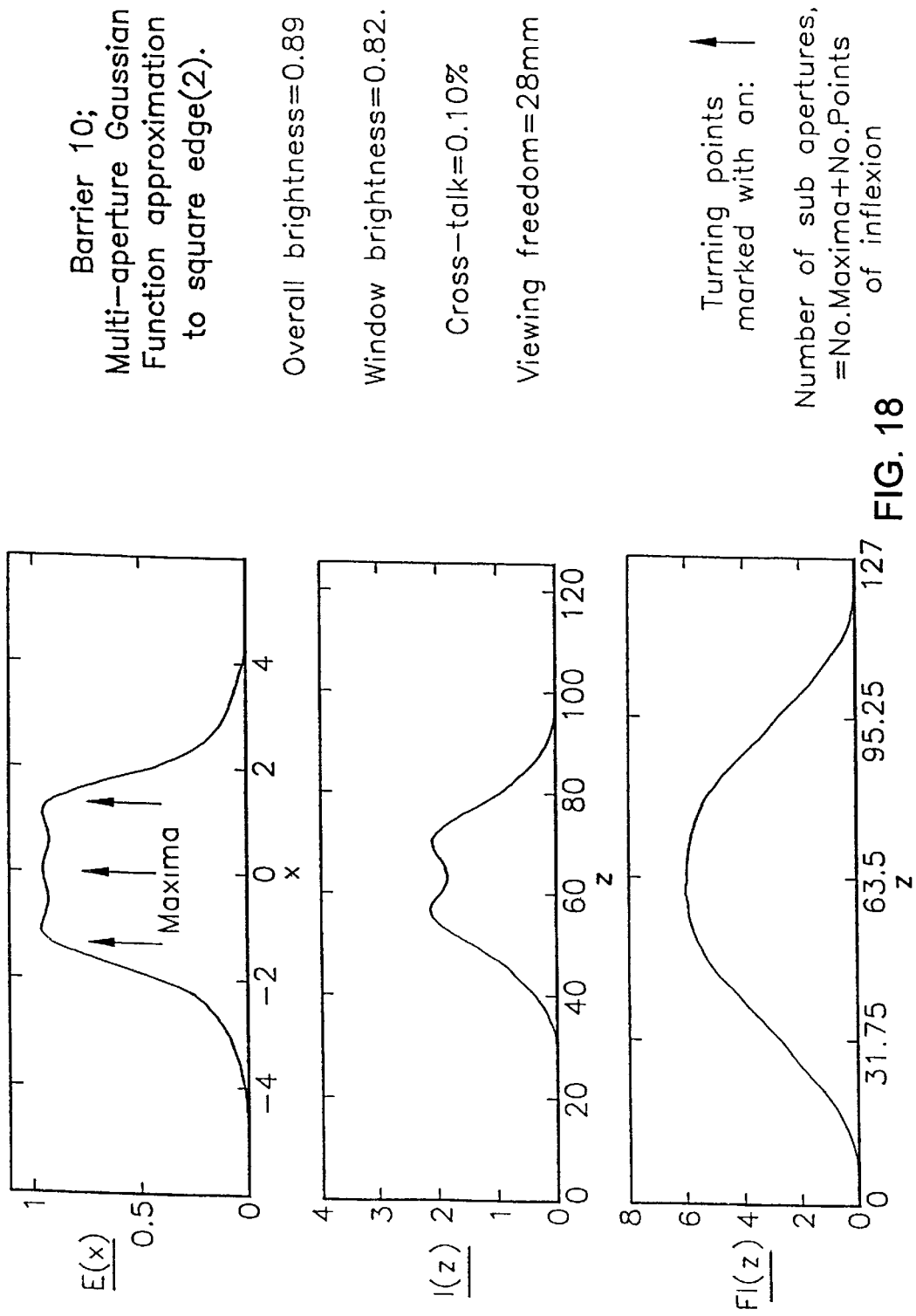
Figure 19:
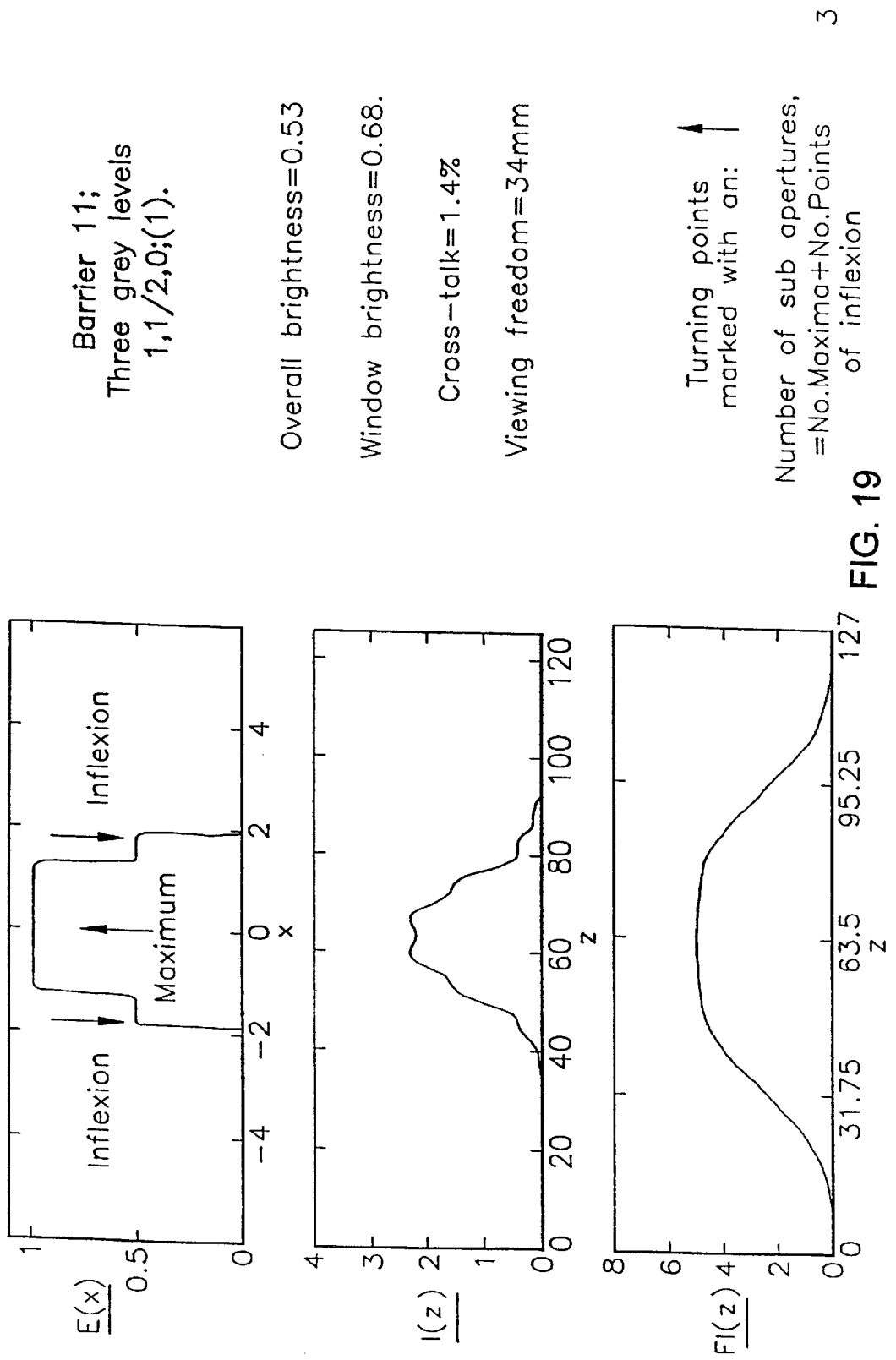
Figure 20:
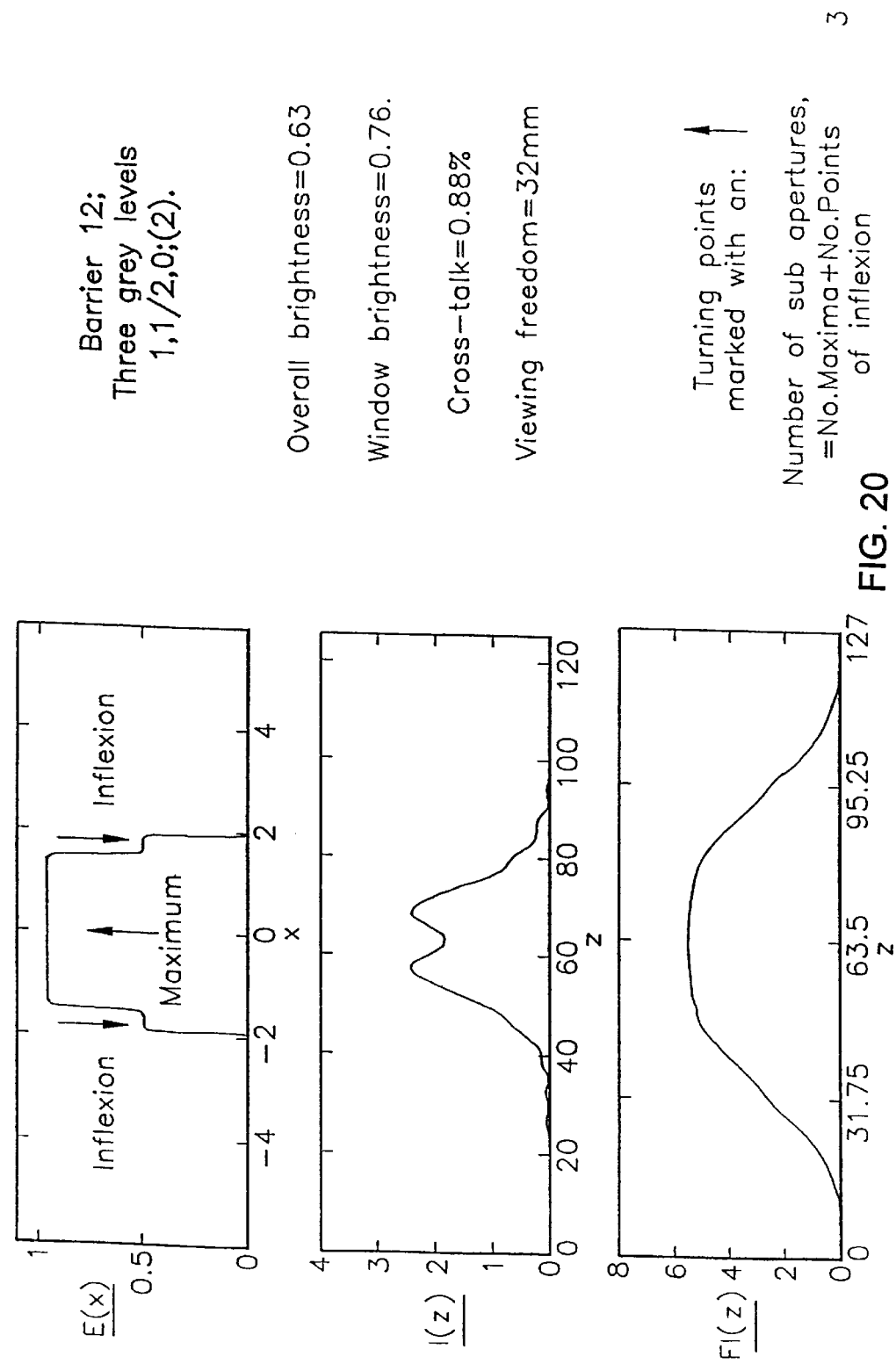
Figure 21:
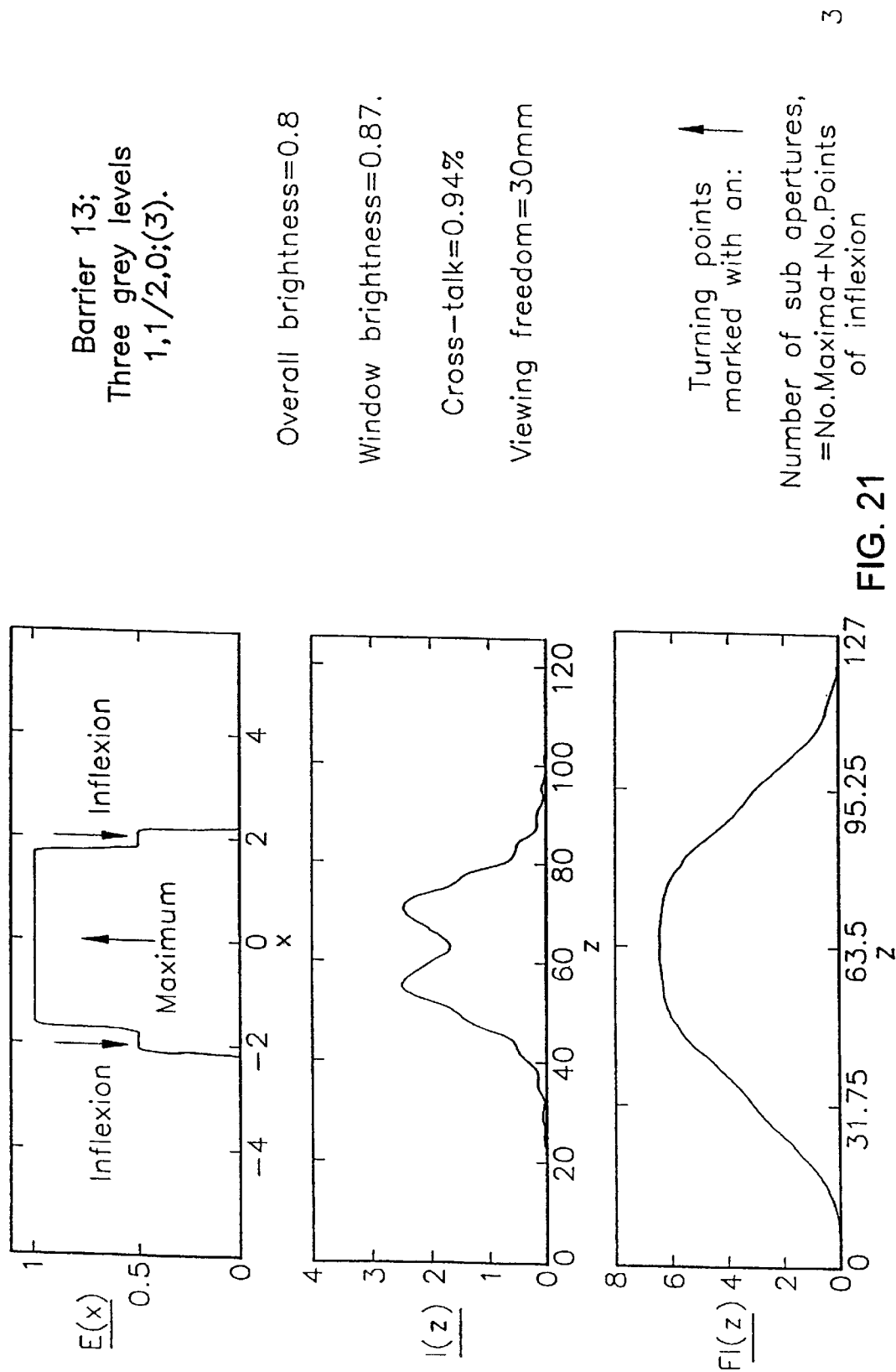
Figure 22:
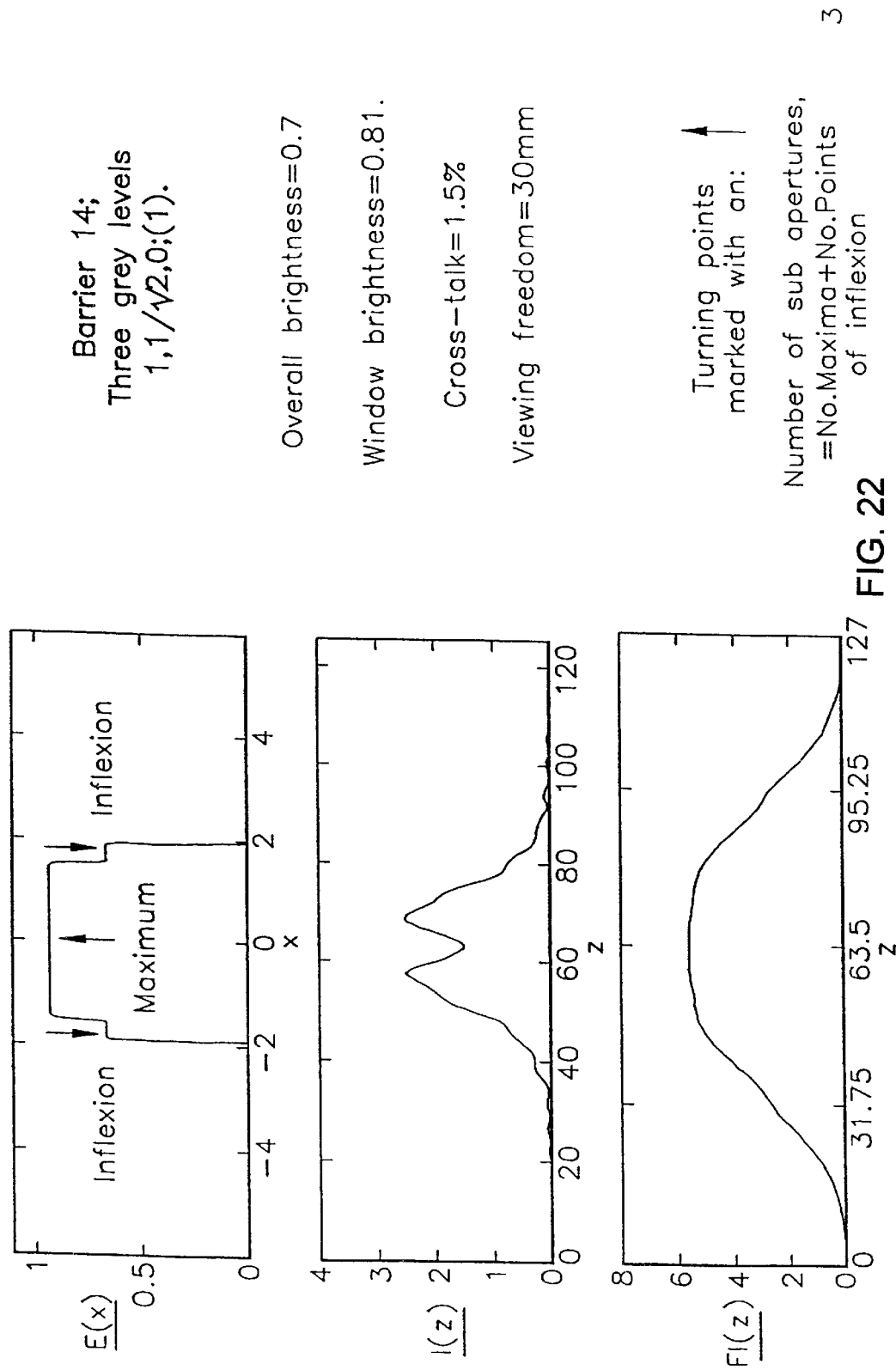
Figure 23:
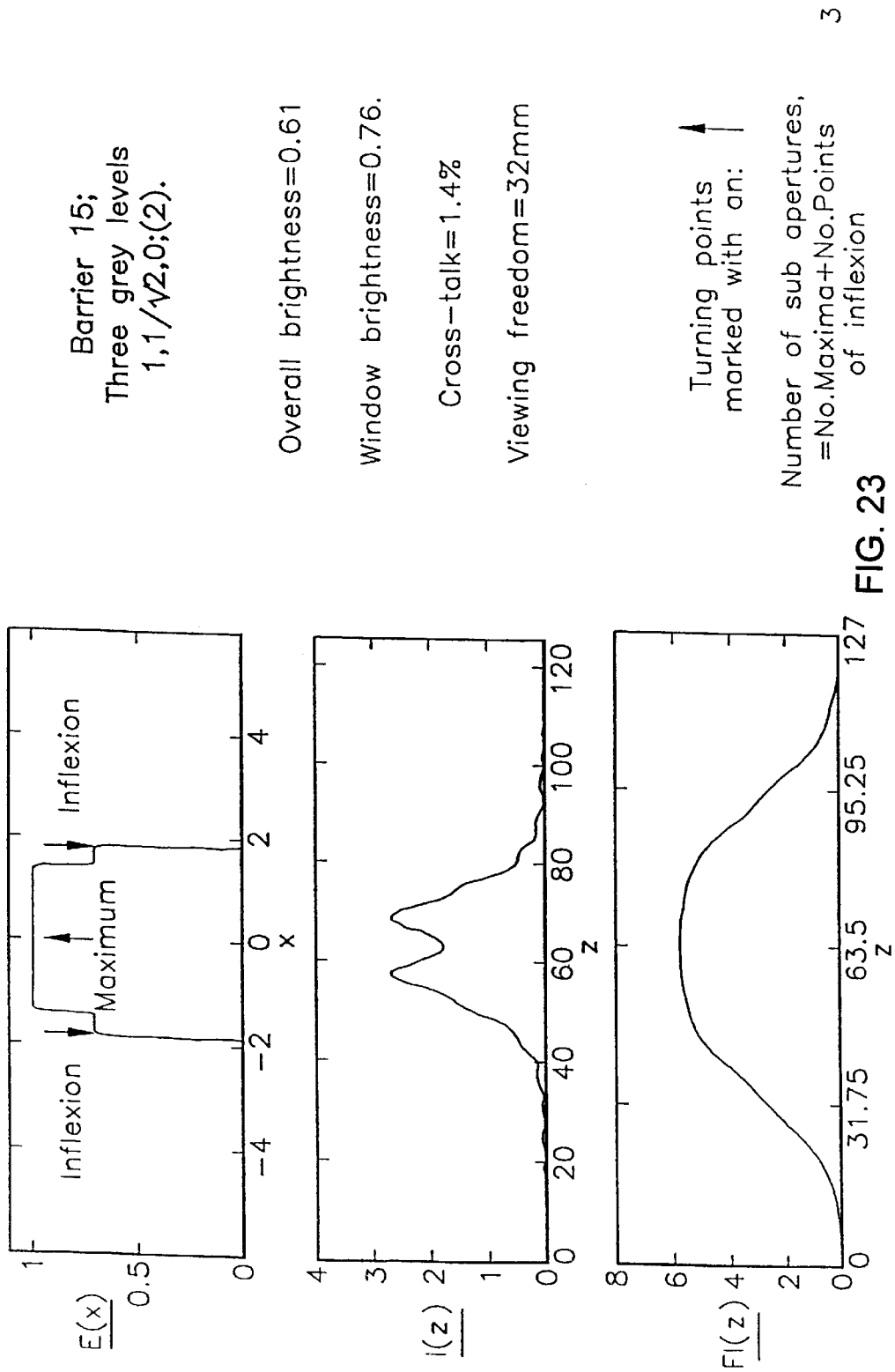
Figure 24:
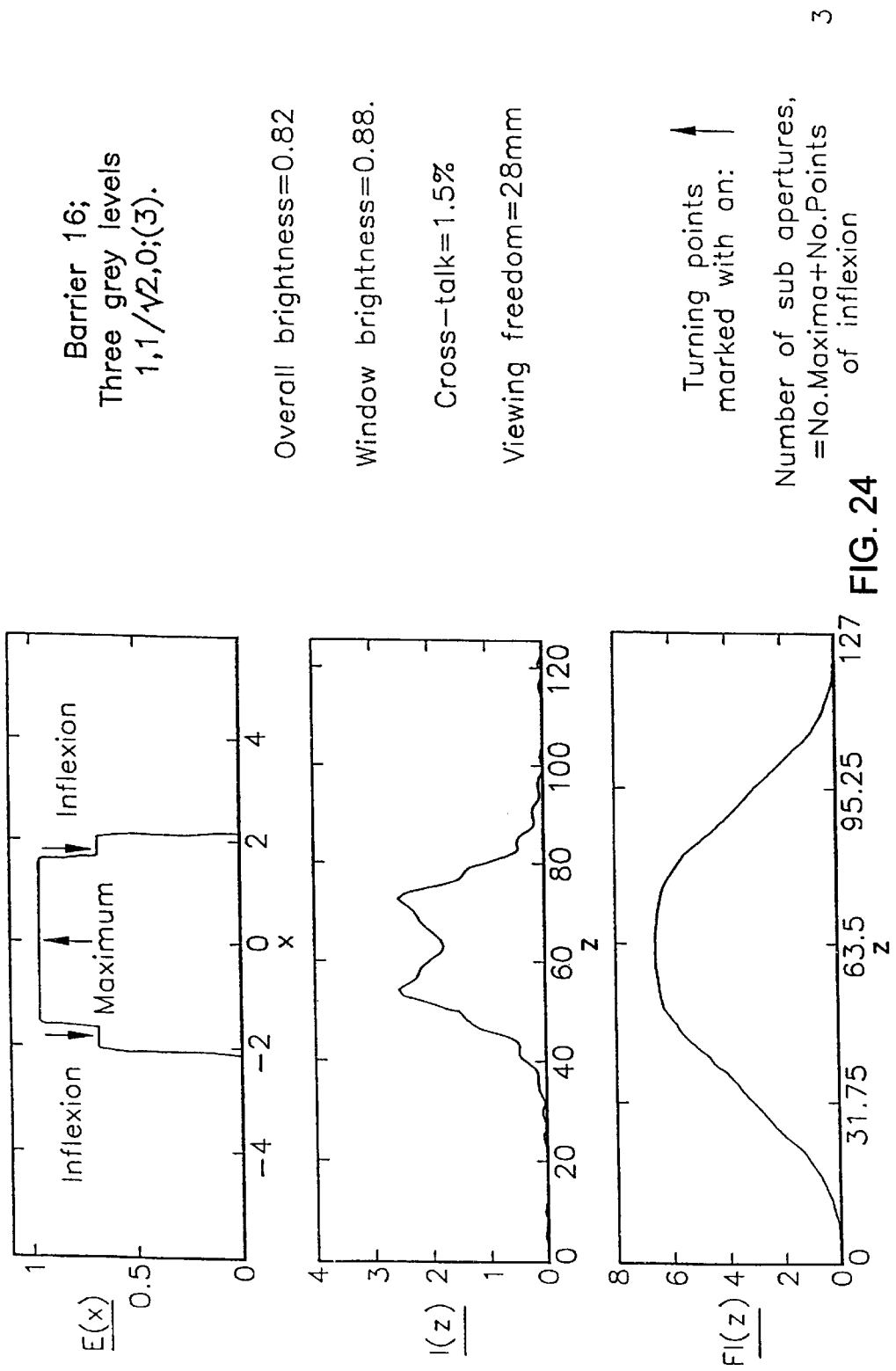

The following barrier transmission functions are compared:

Barrier 1. Softened square edge barrier, $\alpha$=20. FIG. 9).
Barrier 2. Softened square edge barrier, $\alpha$=4. (FIG. 10).
Barrier 3. Softened square edge barrier, $\alpha$=2. FIG. 11)
Barrier 4. Softened square edge barrier, $\alpha$=1.6. (FIG. 12)
Barrier 5. Softened square edge barrier, $\alpha$=1. (FIG. 13)
Barrier 6. Gaussian profile, $\alpha$=1. (FIG. 14)
Barrier 7. Sinc-squared function, $\alpha$=1. (FIG. 15)
Barrier 8. Sinc-squared function, $\alpha$=⅔. (FIG. 16)
Barrier 9. Square root Gaussian approximation to softened edge, (FIG. 17)
three terms with the following coefficients:
$\alpha_1$1, $\gamma_1$=0₁ $\delta_1$=0.6 $\alpha_2$=0.65: $\delta_2$=0.65: $\delta_2$=0.25
Barrier 10. Square root Gaussian approximation to softened edge, (FIG. 18)
three items with the following coefficients:
$\alpha_1$1, $\gamma_2$=0; $\delta_1$=0.61 $\Omega_2$=0.57; $\gamma_2$=0.59; $\delta_2$=0.25
Barrier 11. Grey level function, three levels, 1, ½, 0, (FIG. 19)
with the following coefficients:
$\alpha_1$=40, $\gamma_1$=0; $\delta_1$=0.591 $\alpha_2$=60; $\gamma_2$=0.729; $\delta_2$=0.138
Barrier 12. Grey level function, three levels 1, ½, 0, p1 (FIG. 20)
with the following coefficients:
$\alpha_1$=40, $\gamma_1$=0; $\delta_1$=0.7 $\alpha_2$=60; $\gamma_2$=0.795; $\delta_2$=0.095
Barrier 13. Grey level function, three levels, 1, ½, 0, (FIG. 21)
with the following coefficients:
$\alpha_1$=40, $\gamma_1$=0; $\delta_1$=0.6 $\alpha_2$=60; $\delta_2$=0.895; $\delta_2$=0.095
Barrier 14. Grey level function, three levels, 1, 1/√2, 0, (FIG. 22)
with the following coefficients:
$\alpha_1$=70, $\gamma_1$=0; $\delta_1$=0.7 $\alpha_2$=80; $\gamma_2$=0.795; $\delta_2$=0.095
Barrier 15. Grey level function, three levels, 1, 1/√2, 0, (FIG. 23)
with the following coefficients:
$\alpha_1$=70, $\gamma_1$=0; $\delta_1$=0.65 $\alpha_2$=80; $\gamma_2$=0.745; $\delta_2$=0.095
Barrier 16. Grey level function, three levels, 1, 1/√2, 0, (FIG. 24)
with the following coefficients:
$\alpha_1$=70, $\gamma_2$=0; $\delta_1$=0.75 $\alpha_2$=60; $\gamma_2$=0.86; $\delta_2$=0.11

The transmission functions with their Fresnel diffraction pattern and window shapes are shown in FIGS. 9 to 24. The maxima and points of inflexion are indicated in the transmission functions.

| Barrier Number | Relative Window Brightness | Cross talk | 90% window full width, mm | 5% dark full width, mm | FIG. Number |
|---|---|---|---|---|---|
| 1 | 1.00 | 3.5% | 26 | 26 | 9 |
| 2 | 0.95 | 1.1% | 26 | 28 | 10 |
| 3 | 0.89 | 0.35% | 26 | 28 | 11 |
| 4 | 0.86 | 0.30% | 26 | 28 | 12 |
| 5 | 0.78 | 0.77% | 26 | 26 | 13 |
| 6 | 0.63 | 0.82% | 30 | 30 | 14 |
| 7 | 0.34 | 0.3% | 40 | 46 | 15 |
| 8 | 0.50 | 0.5% | 38 | 38 | 16 |
| 9 | 0.83 | 0.13% | 26 | 28 | 17 |
| 10 | 0.80 | 0.10% | 28 | 30 | 18 |
| 11 | 0.66 | 1.4% | 34 | 36 | 19 |

-continued

| Barrier Number | Relative Window Brightness | Cross talk | 90% window full width, mm | 5% dark full width, mm | FIG. Number |
|---|---|---|---|---|---|
| 12 | 0.75 | 0.88% | 32 | 34 | 20 |
| 13 | 0.85 | 0.94% | 30 | 30 | 21 |
| 14 | 0.80 | 1.5% | 30 | 32 | 22 |
| 15 | 0.75 | 1.4% | 32 | 34 | 23 |
| 16 | 0.86 | 1.5% | 28 | 30 | 24 |

As mentioned hereinbefore, barrier number 1, whose aperture transmission function against position, Fresnel diffraction pattern produced by a single point at the pixel plane, and convoluted window function obtained for imaging by a full pixel width are shown in FIG. 9, represents the conventional parallax barrier having a "top hat" optical transmission function. In this specific example, a crosstalk figure of 3.5% results from diffraction from the square edges and is inadequate for many high quality display systems. Barriers numbers 2 to 6, whose performances are shown in FIGS. 10 to 14, are modified versions or approximations of such a single sub-aperture optical transmission profile.

Barriers numbers 7 to 16, whose performances are illustrated in FIGS. 15 to 24, constitute embodiments of the invention. The achievable compromise between crosstalk performance and viewing freedom represents a substantial improvement over the other barriers. Thus, where a particular crosstalk performance is required, the embodiments of the invention give improved viewing freedom. Convensely, where a specific viewing freedom is required, an improved crosstalk performance can be achieved. The significant improvement in crosstalk performance obtained by soft edges is further enhance by using multiple sub-aperture with a grey scale. A corollary of this is that, for a given crosstalk, the brightness improvement resulting from soft edges is further enhanced by using multiple sub-aperture.

It is also possible that, because of the softened edges and because light emerges more evenly from the barrier, the visual appearance of a given display mode may be improved.

The known type of barrier are characterised by having a single sub-aperture in each aperture and this in turn is characterised by a single maximum as shown in FIGS. 9 to 14. The embodiments of the invention shown in FIG. 15 to 24 are characterised by multiple sub-apertures in each aperture and this is characterised by the maxima and points of inflexion indicated in FIGS. 15 to 24. The sinc-squared function illustrated in FIG. 15 has five maxima representing five sub-apertures. The sinc-squared function illustrated in FIG. 16 and the "Gaussian" approximations illustrated in FIGS. 17 and 18 have three maxima representing three sub-apertures. The grey level functions illustrated in FIGS. 19 to 24 have one maximum and two points of inflexion representing three sub-apertures.

Figure 25:
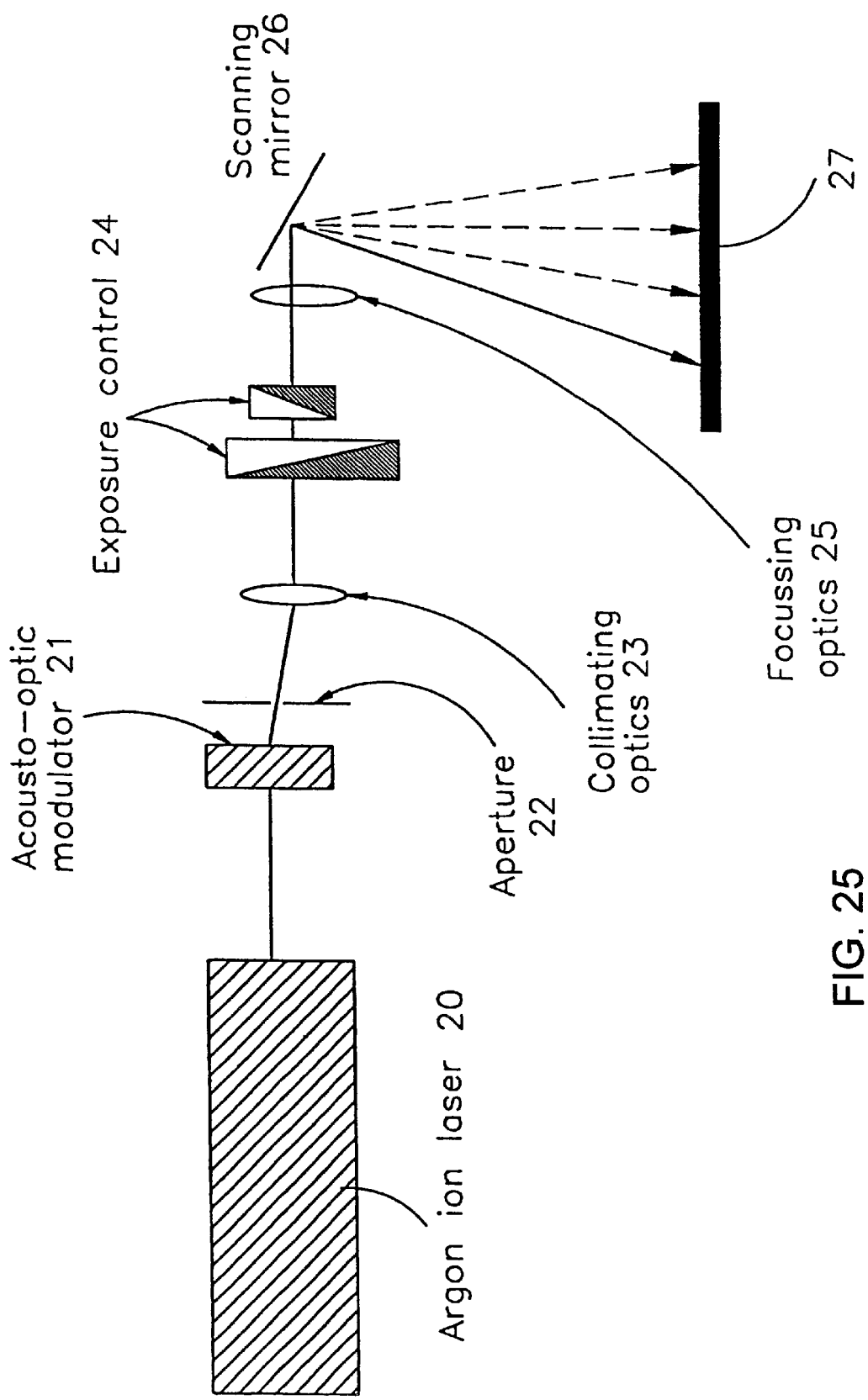
FIG. 25 is a diagram illustrating a first method of making a parallax barrier constituting an embodiment of the invention.

FIG. 25 illustrates a technique for making a parallax barrier constituting an embodiment of the invention. This technique may be used to create individual parallax barriers. However, this technique may also be used to create a master from which actual parallax barriers may be formed by copying, for example by illuminating copy material from the master by contact or projection.

The apparatus shown in FIG. 25 comprises an argon ion laser 20 whose output light beam can be deflected by an acousto-optic modulator 21. The output beam from the modulator 21 is directed towards an aperture 22 so that modulation of the intensity of the output direction by the modulator 21 varies the position of the light beam with respect to the aperture 22 and this varies the output light intensity from the aperture 22 between 0 and a maximum value.

Light from the aperture 22 is collimated by collimating optics 23 and supplied via exposure control means 24 for adjusting the laser beam intensity so that grey scale can be recorded. The resulting light beam is focused by focusing optics 25 and supplied to a scanning mirror 26 which scans the output light beam across the surface of a recording material 27 for recording a master pattern or for forming a parallax barrier.

The apparatus shown in FIG. 25 is of conventional type and is used such that control of grey level produces various intensity functions. The apparatus may be of the moving or fixed bed type or may be a combination.

Figure 26:
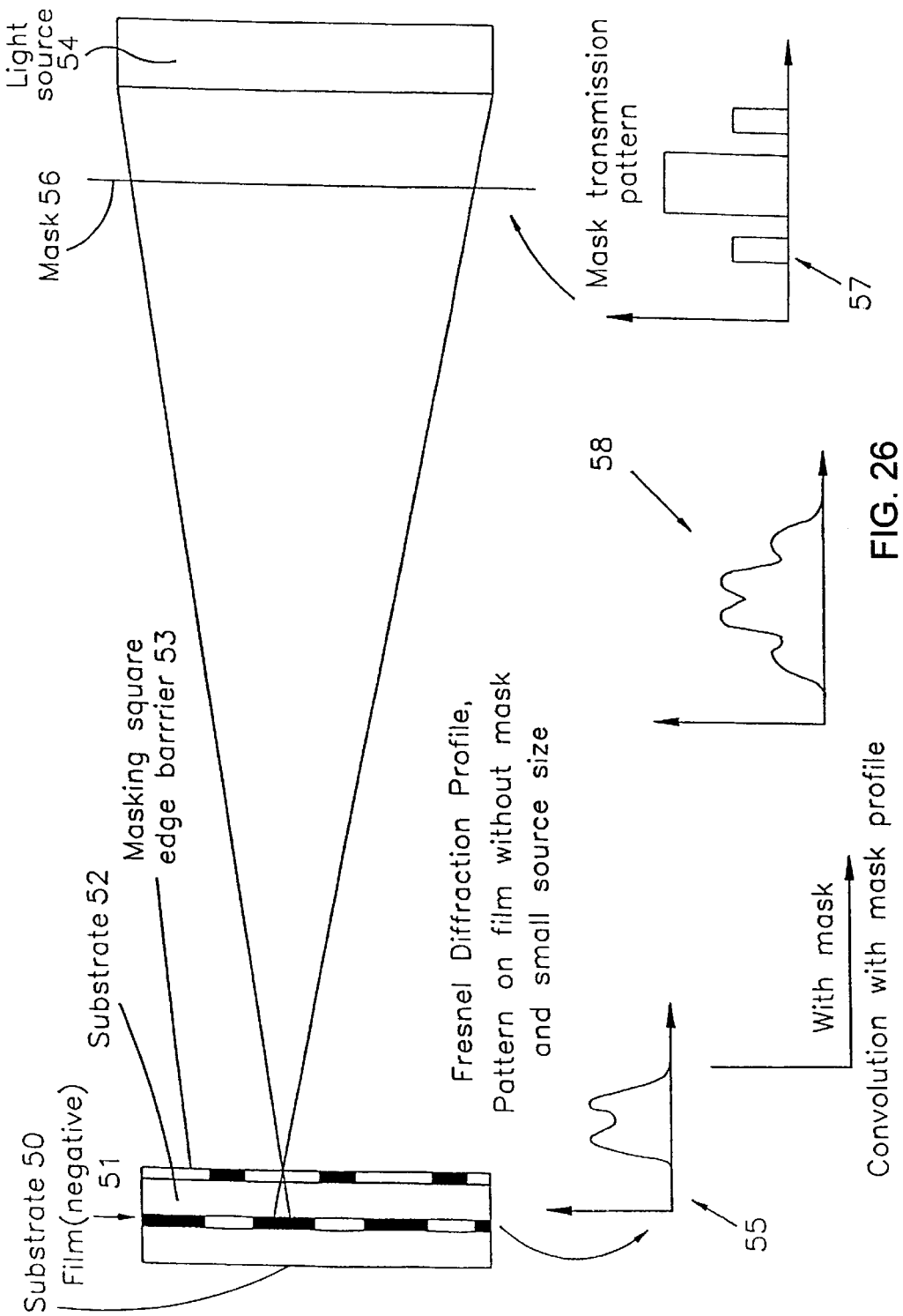
FIG. 26 is a diagram illustrating a second method of making a parallax barrier constituting an embodiment of the invention.

FIG. 26 illustrates another technique for making a parallax barrier constituting an embodiment of the invention. A substrate 50 carries a photographic (negative) film which is adjacent a further substrate 52 carrying a masking square edge barrier 53. This is illuminated by a light source 54 of known finite size. The substrates 50 and 52, which may be of glass, are fixed together such that the film 51 and the barrier 53 are a known fixed distance apart with the barrier 53 facing the light source 54.

The film 51 is exposed through the barrier 53 which results in a Fresnel pattern as illustrated at 55 being recorded on the film 51. The exposed film 51 is developed to produce a multiple sub-aperture barrier whose transmission function is determined by the pitch of the barrier 53, the width of the apertures in the barrier 53, the spacing between the film 51 and the barrier 53 and the spacing between the barrier 53 and the light source 54.

An optional mask 56 is shown in FIG. 26. The mask 56 may be used to control the pattern recorded on the film 51. In particular, the mask 56 is imaged through each of the apertures of the barrier 53 so as to produce a pattern on the film 51 which depends on the pattern of the mask 56. An example of a transmission pattern of the mask 56 is shown at 57 and the resulting transmission function recorded on the film 51 behind each aperture of the barrier 53 is illustrated at 58.

The mask 56 may be in the form of a printed transparency, for example produced by photographic techniques. However, the mask 56 may be of any suitable form and may, for example, comprise a computer controlled liquid crystal device.

Figure 27:
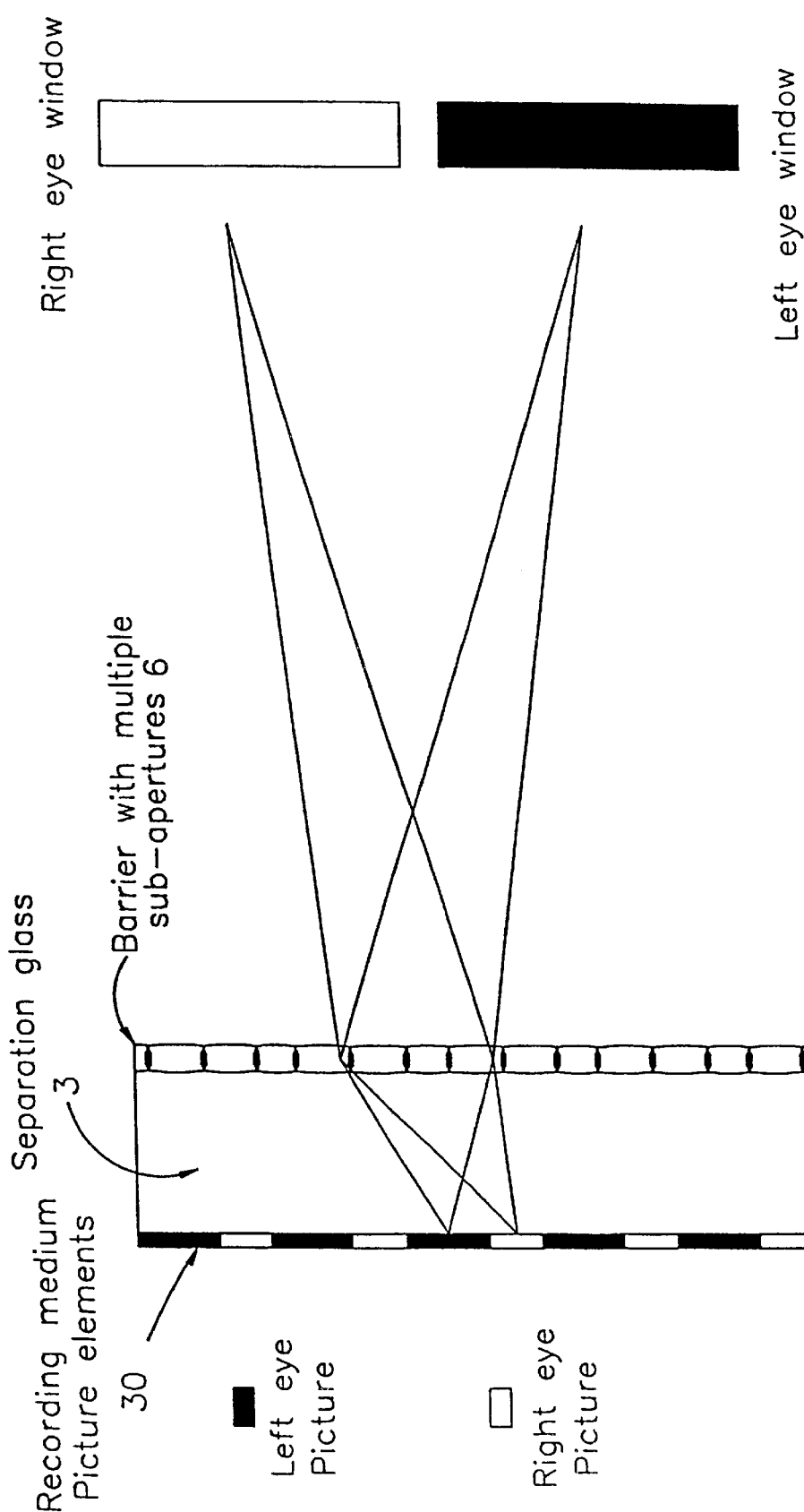
FIG. 27 is a horizontal cross-sectional view of an autostereoscopic 3D picture constituting an embodiment of the invention.

Parallax barriers constituting embodiments of the invention may be used in displays of the type shown in FIG. 1 to provide 3D displays. However, such parallax barriers may be used in other types of displays, for example rear parallax barrier displays. Also, such parallax barriers may be used to provide autostereoscopic 3D pictures as shown in FIG. 27 by aligning the barriers with a recording medium 30 such as photographic medium containing a spatially multiplexed 3D image. Such pictures may be illuminated from the rear or from the front.

The multiple grey level barriers numbers 11 to 16, whose performances are shown in FIGS. 19 to 24, may be made as described hereinbefore. However, these barriers may also be made in the form of a birefringent layer whose optic axis orientation varies so as to represent the optical transmission function. This layer cooperates with a polariser layer so as to provide the required optical transmission function.

Figure 28:
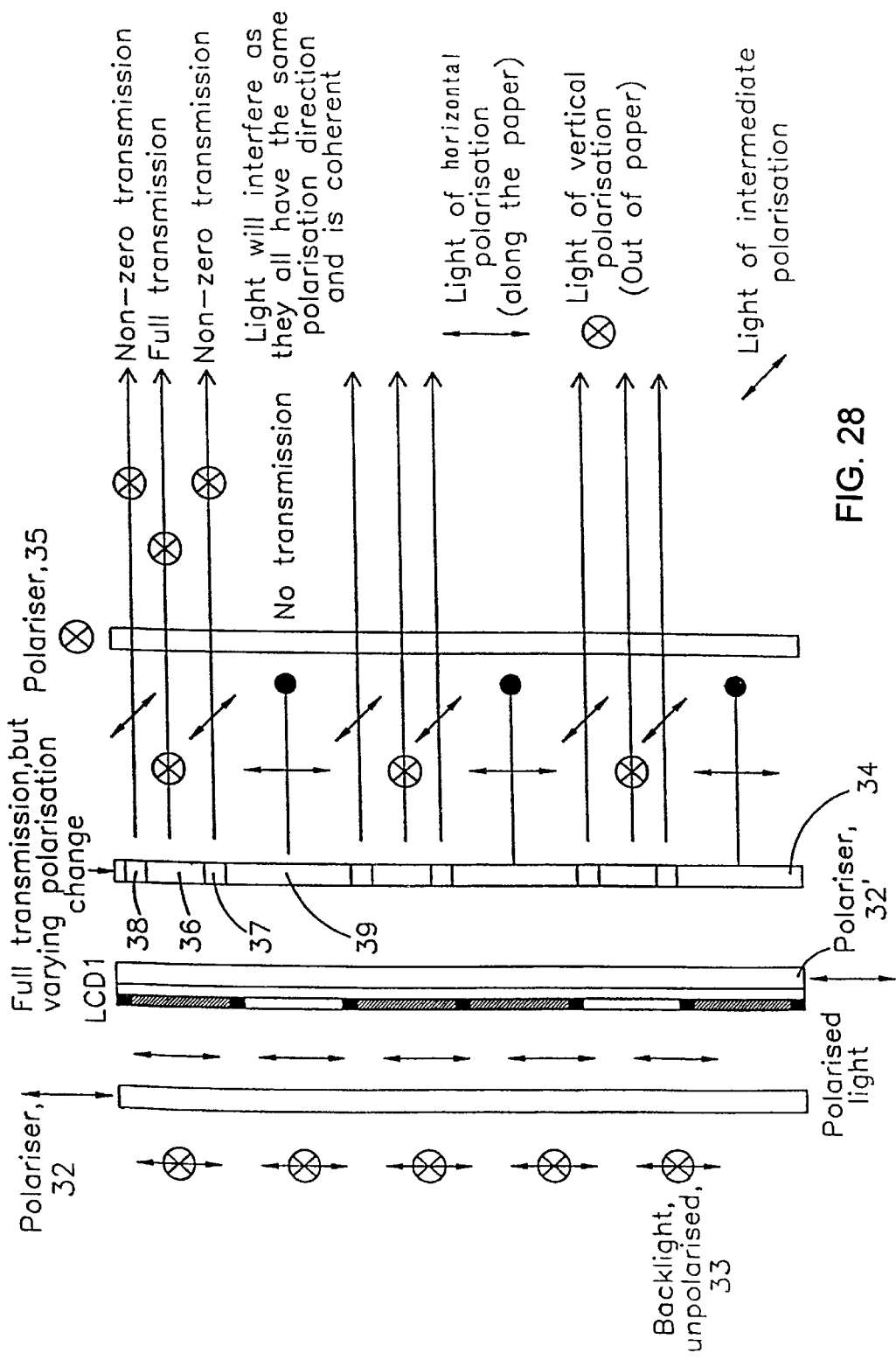
FIG. 28 is a horizontal cross-sectional view of an autostereoscopic display constituting an embodiment of the invention.
Figure 29:
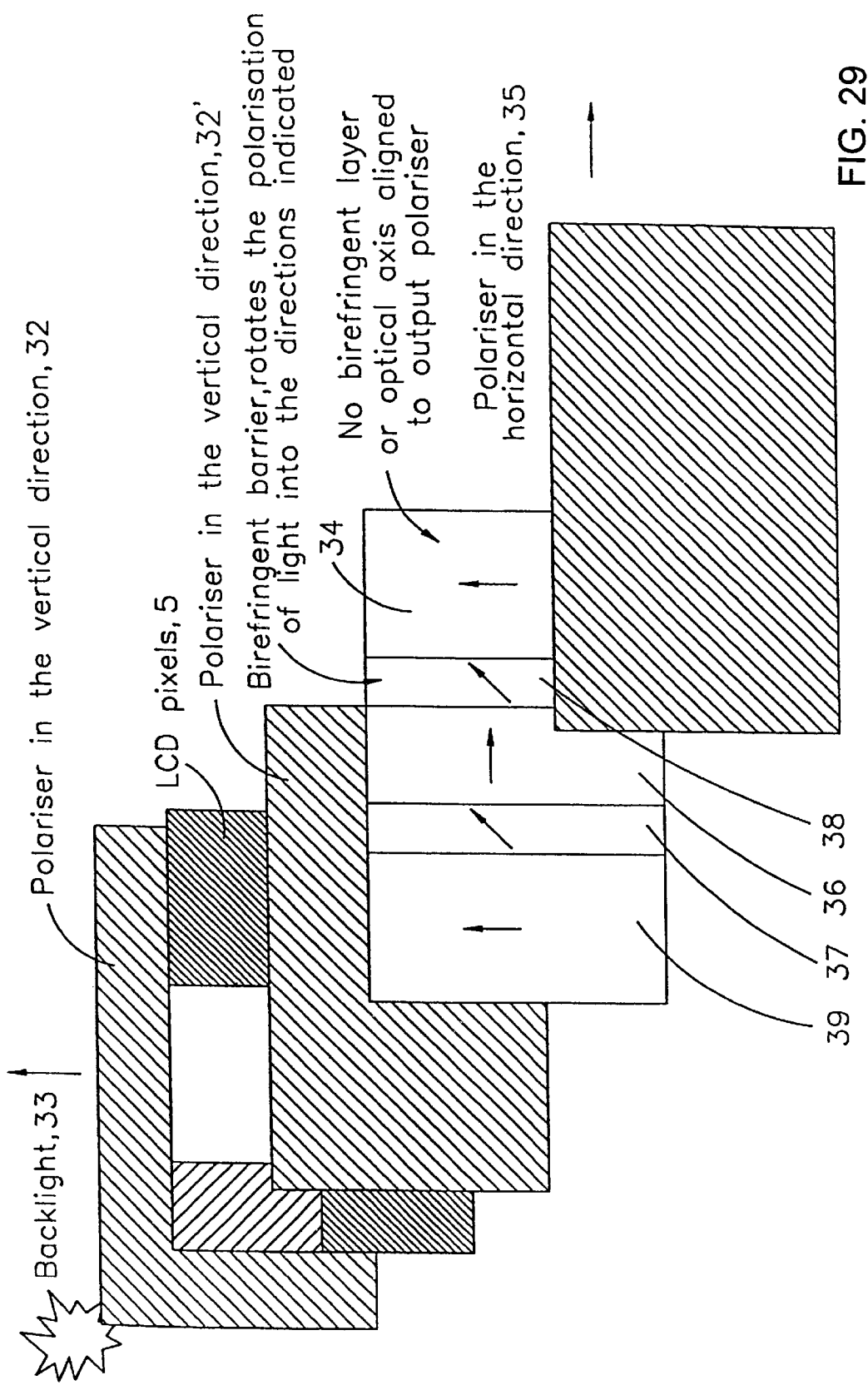
FIG. 29 is an exploded view of the display of FIG. 28.

A display incorporating a barrier of this type is shown in FIGS. 28 and 29. The LCD 1 has an input polariser 32 which polarises unpolarised light from a backlight 33. The light which is therefore supplied to the pixels 5 is horizontally polarised and the pixels 5 vary the transmission in accordance with the displayed image data.

Light from the pixels passes through a second polariser 32' to a layer 34 comprising parallel vertical stripes which have different widths and which have different effects on the direction of polarisation. Light from the layer 34 passes to an output polariser 35 having a vertical polarising direction.

The layer 34 comprises, for each aperture, a central birefringent stripe 36 and birefringent stripes 37 and 38 forming a group separated from adjacent such groups by non-birefringent stripes such as 39. The stripe 36 rotates the polarisation of light so that it is vertical whereas the stripes 37 and 38 rotate the polarisation of light so that it is inclined to both the vertical and horizontal directions. The stripes 39 do not affect the polarisation, which thus remains horizontal.

As illustrated diagrammatically in FIG. 28, light passing through the stripes 36 is polarised in the vertical direction and so passes through the polariser 35 with minimal attenuation. Light passing through the stripes 37 and 38 is polarised at an acute angle to the vertical and so passes through the polariser 35 but is attenuated. Light passing through the stripes 39 is polarised horizontally and so is substantially extinguished by the polariser 35. Thus, a parallax barrier of the type whose performance is illustrated in FIGS. 19 to 24 may be provided.

Techniques for forming such birefringent layers are disclosed in GB 2 326 729 and EP 0 887 667, the contents of which are incorporated herein by reference. Although these patent specifications disclose forming regions with two different optic axis orientations and hence would provide two different output intensities, it is possible to provide three optic axis orientations by using a triple-rubbing technique so as to provide the three grey level functions whose performances are illustrated in FIGS. 19 to 24. Such an arrangement may then provide a 2D mode of operation when the polariser is removed.

Figure 30:
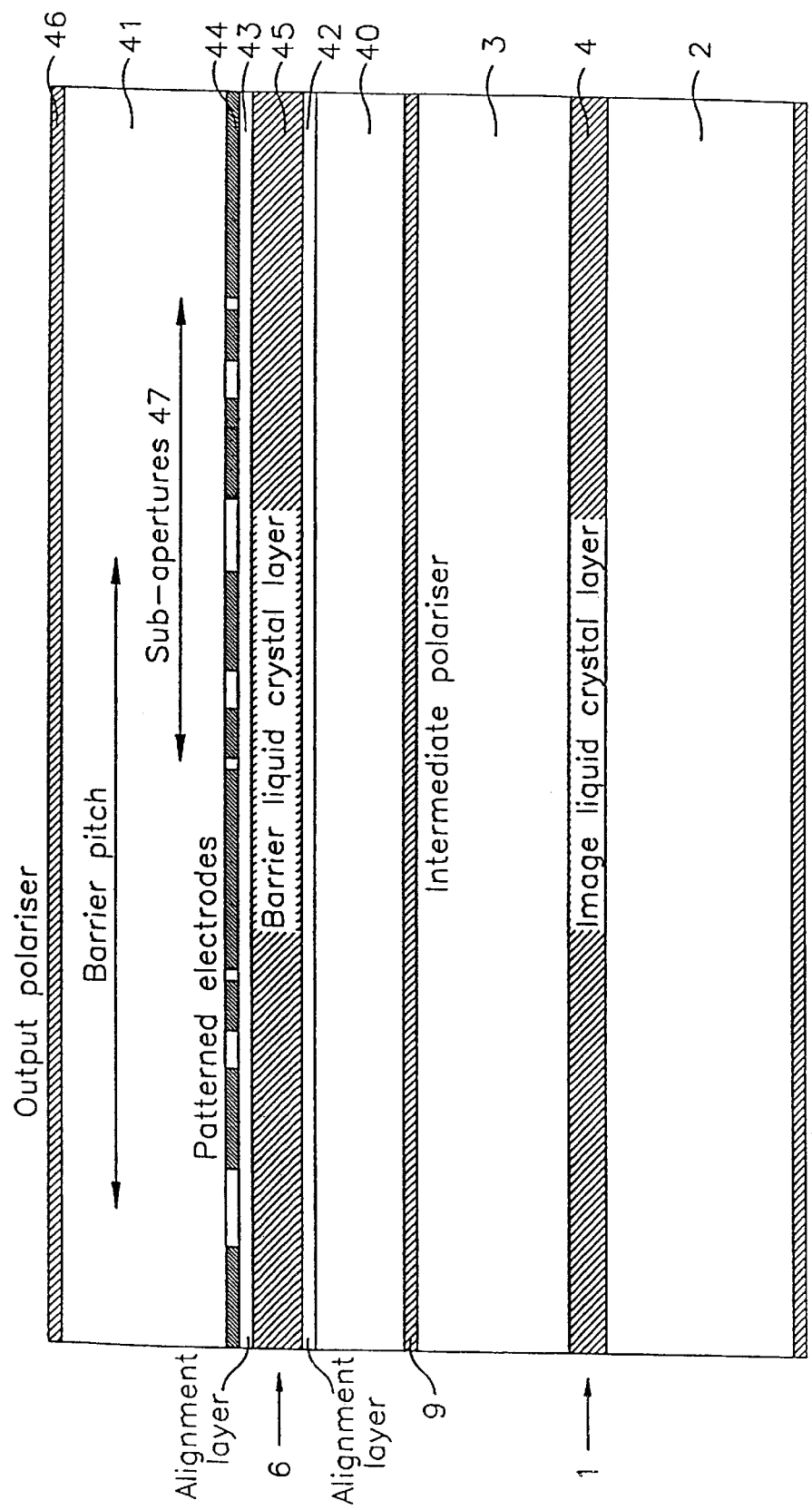
FIG. 30 is a cross-sectional view of another parallax barrier and autostereoscopic 3D display constituting an embodiment of the invention.

FIG. 30 shows an autostereoscopic 3D display comprising an LCD 1 of the type described hereinbefore cooperating with an active parallax barrier based on a twisted nematic liquid crystal arrangement. The barrier 6 comprises substrates 40 and 41. The substrate 40 has formed thereon an alignment layer 42, which faces an alignment layer 43 and an electrode layer 44 formed on the substrate 41. A nematic liquid crystal layer 45 is provided between the alignment layers 42 and 43. The substrate 41 is provided with an output polariser 46. A plane electrode (not shown) is formed on the substrate 40 below the alignment layer 42.

The electrode layer 44 is formed as patterned electrodes to which a suitable alternating current is supplied in order to activate the parallax barrier. The patterning of the electrodes is such that, when activated, the liquid crystal below the electrodes passes light without affecting the polarisation thereof whereas the liquid crystal below the spaces between the electrodes rotate the polarisation of light by 90°. The polarising direction of the intermediate polariser 9 and the output polariser 46 are orthogonal so that light from the LCD 1 is transmitted through a plurality of sub-apertures 47 forming each aperture of the parallax barrier 6.

Because of non-uniformities in the field across the liquid crystal layer 45 at the edges of the electrodes, the sub-apertures do not have sharp edges but instead provide a grey scale transition at the edge of each sub-aperture.

In the absence of an applied electric field across the liquid crystal layer 45, the whole liquid crystal layer rotates the polarisation of light by 90°. Thus, the barrier structure effectively becomes transparent and the display operates in a full resolution 2D mode.

Figure 31:
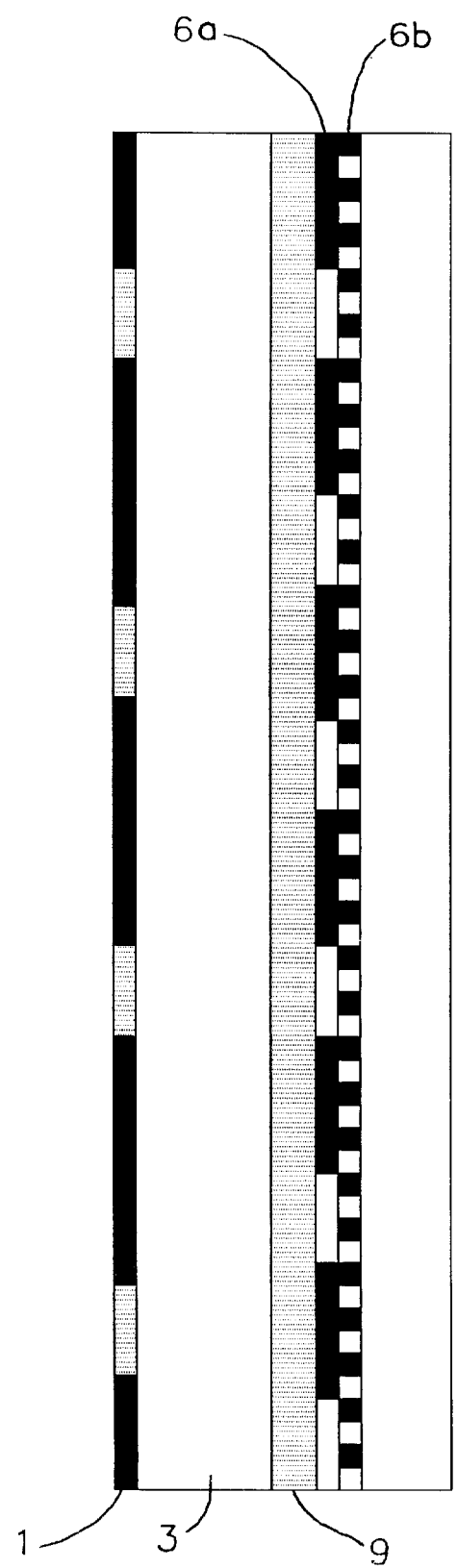
FIG. 31 is a cross-sectional view of a further parallax barrier and autostereoscopic 3D display constituting an embodiment of the invention.

In the display shown in FIG. 31, the parallax barrier is in the form of first and second layers 6a and 6b in intimate contact with each other and in contact with the polariser 9 of the LCD. The first layer 6a is in the form of a first barrier having a substantially rectangular transmission function with a pitch defining the pitch of the apertures of the parallax barrier. The second layer 6b has an optical transmission function in the form of a sine wave whose dark areas are less than 100% light-absorbing. The spatial frequency of the sine wave is such that there are three sub-apertures in each barrier pitch when the layers 6a and 6b are superimposed so as to form the parallax barrier.

When the display shown in FIG. 31 has the dimensions of the particular example described hereinbefore, the layer 6a may comprise a barrier of the type described hereinbefore as barrier 1 with the width of each aperture being 55 micrometers and the value $\alpha=11$. A display incorporating only the layer 6a would then have a crosstalk of 2.2%. The layer 6b has an optical transmission which varies between 100% and 70% transmission and a pitch of 17.3 micrometers. Such an arrangement has a crosstalk of 1%.

What is claimed is:

1. A parallax barrier comprising a plurality of parallel elongate apertures extending in a first direction, each of the apertures comprising a plurality of sub-apertures, such that the plurality of sub-apertures each provide an optical transmission function which varies across the first direction in a second direction which is perpendicular to the first direction.

2. A barrier as claimed in claim 1, characterised in that the apertures are of substantially the same width in the second direction.

3. A barrier as claimed in claim 1, characterised in that the optical transmission function is substantially constant in the first direction.

4. A barrier as claimed in claim 1, characterised in that at least some of the sub-apertures of each aperture have different widths in the second direction.

5. A barrier as claimed in claim 1, characterised in that at least some of the sub-apertures of each aperture have different optical transmission functions in the second direction.

6. A barrier as claimed in claim 1, characterised in that the optical transmission function is a sine-squared function in the second direction.

7. A barrier as claimed in claim 1, characterised in that the optical transmission function is the square root of a sum of Gaussian functions in the second direction.

8. A barrier as claimed in claim 7, characterised in that the sub-apertures of each aperture are superimposed such that the optical transmission function is non-zero throughout the aperture.

9. A barrier as claimed in claim 7, characterised in that each aperture comprises (2m+1) sub-apertures, where m is a positive integer.

10. A barrier as claimed in claim 9, characterised in that the optical transmission function in the second direction of a central sub-aperture of the 2m+1 sub-aperture of an aperture, has a maximum which is greater than the maxima of the optical transmission functions in the second direction of the other sub-apertures of the aperture.

11. A barrier as claimed in claim 9, characterised in that m=1.

12. A barrier as claimed in claim 1, characterised in that the optical transmission function is a step function in the second direction.

13. A barrier as claimed in claim 12, characterised in that the sub-apertures of each aperture are superimposed such that the optical transmission function is non-zero throughout the aperture.

14. A barrier as claimed in claim 13, characterised in that each aperture comprises (2m+1) sub-apertures, where m is a positive integer.

15. A barrier as claimed in claim 14, characterised in that the optical transmission function in the second direction of a central sub-aperture of the 2m+1 sub-apertures of an aperture, has a maximum which is greater than the maxima of the optical transmission functions in the second direction of the other sub-apertures of the aperture.

16. A barrier as claimed in claim 14, characterised in that m=1.

17. A barrier as claimed in claim 1, including a photographic medium in which the optical transmission function is recorded.

18. A barrier as claimed in claim 1, having a plurality of layers.

19. A barrier as claimed in claim 18, characterised in that adjacent layers of the plurality of layers are substantially in contact with each other.

20. A barrier as claimed in claim 18, characterised in that one of the layers has an optical transmission function which substantially defines the apertures and the other layer or layers have an optical transmission function which substantially defines the sub-apertures.

21. A barrier as claimed in claim 20, characterised in that the other layer comprises a single layer.

22. A barrier as claimed in claim 21, characterised in that the optical transmission function of the one layer in the second direction is a substantially rectangular function and the optical transmission function of the other layer in the second direction is a sinusoidal function superimposed on a constant function so as to have non-zero optical transmission throughout the second direction.

23. A barrier as claimed in claim 1, made in the form of a birefringent layer cooperating with a polariser, so that the optical transmission function is encoded as an optic axis orientation function in the birefringent layer.

24. A barrier as claimed in claim 1, comprising a liquid crystal device having a patterned electrode for applying an electric field across a liquid crystal layer of the device so as to form the optical transmission function.

25. An autostereoscopic 3D picture characterised by a barrier as claimed in claim 1 cooperating with a recording medium in which is recorded a spatially multiplexed 3D image.

26. An autostereoscopic 3D display characterised by a barrier as claimed in claim 1 cooperating with a spatial light modulator for modulating light with a spatially multiplexed 3D image.

27. A display as claimed in claim 26 characterised in that the spatial light modulator comprises a liquid crystal display.

28. A parallax barrier as claimed in claim 1, wherein the optical transmission function has at least one point of inflexion.

* * * * *